US 9,154,399 B2

(12) United States Patent
Montemurro et al.

(10) Patent No.: US 9,154,399 B2
(45) Date of Patent: *Oct. 6, 2015

(54) METHODS AND APPARATUS FOR PROVIDING SESSION POLICY DURING A REGISTRATION OF A DEVICE

(75) Inventors: Michael Montemurro, Mississauga (CA); Andrew Allen, Mundelein, IL (US); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 684 days.

This patent is subject to a terminal disclaimer.

(21) Appl. No.: 12/615,536

(22) Filed: Nov. 10, 2009

(65) Prior Publication Data

US 2010/0146130 A1    Jun. 10, 2010

Related U.S. Application Data

(60) Provisional application No. 61/112,873, filed on Nov. 10, 2008.

(51) Int. Cl.
*H04L 29/02* (2006.01)
*H04W 80/10* (2009.01)
*H04L 12/701* (2013.01)
(Continued)

(52) U.S. Cl.
CPC ............... *H04L 45/00* (2013.01); *H04L 63/16* (2013.01); *H04L 63/20* (2013.01); *H04L 65/1006* (2013.01); *H04W 12/06* (2013.01); *H04W 76/02* (2013.01); *H04W 76/022* (2013.01); *H04L 63/205* (2013.01); *H04L 65/1016* (2013.01);
(Continued)

(58) Field of Classification Search
CPC . H04L 47/20; H04L 61/3085; H04L 65/1006; H04L 65/1016; H04L 65/105; H04L 65/80; H04L 67/28; H04L 67/2809; H04L 67/30; H04L 69/24
See application file for complete search history.

(56) References Cited

U.S. PATENT DOCUMENTS 6,785,256 B2 *  8/2004  O'Neill ......................... 370/338
6,910,074 B1 *  6/2005  Amin et al. ................... 709/227
(Continued)

FOREIGN PATENT DOCUMENTS

CN    1757198 A    4/2006
CN    1929434 A    3/2007
(Continued)

OTHER PUBLICATIONS

Petrie et al., "A Schema and Guidelines for Defining Session Initiation Protocol User Agent Profile Data Sets," pp. 1-37, Oct. 23, 2005.*
(Continued)

*Primary Examiner* — Patrice Winder
(74) *Attorney, Agent, or Firm* — Conley Rose, P.C.; J. Robert Brown, Jr.

(57) ABSTRACT

A method for a user agent to access a session policy in a network is provided. The method comprises the user agent sending a registration message to a first network node. The method further comprises the user agent receiving policy-related information from the first network node in a response to the registration message. The policy-related information is one of the session policy, a Uniform Resource Locator that points to the session policy, and a Policy-Contact header containing a policyContactURI for a policy document.

33 Claims, 18 Drawing Sheets

(51) Int. Cl.
| | |
|---|---|
| H04L 29/06 | (2006.01) |
| H04W 12/06 | (2009.01) |
| H04W 76/02 | (2009.01) |
| H04W 76/04 | (2009.01) |
| H04W 80/04 | (2009.01) |

(52) U.S. Cl.
CPC ............... *H04L 69/24* (2013.01); *H04W 76/04* (2013.01); *H04W 80/04* (2013.01)

(56) References Cited

U.S. PATENT DOCUMENTS

| | | | | |
|---|---|---|---|---|
| 7,788,383 | B2* | 8/2010 | Andreasen | 709/227 |
| 7,830,888 | B2* | 11/2010 | Donovan | 370/395.21 |
| 7,831,701 | B2* | 11/2010 | Hu | 709/224 |
| 8,055,778 | B2* | 11/2011 | Richardson et al. | 709/227 |
| 8,656,451 | B2* | 2/2014 | Hu et al. | 726/1 |
| 2003/0103457 | A1* | 6/2003 | Moran et al. | 370/230 |
| 2003/0176188 | A1* | 9/2003 | O'Neill | 455/433 |
| 2003/0177389 | A1* | 9/2003 | Albert et al. | 713/201 |
| 2004/0105415 | A1 | 6/2004 | Fujiwara et al. | |
| 2004/0116117 | A1 | 6/2004 | Ahvonen et al. | |
| 2004/0218605 | A1* | 11/2004 | Gustafsson et al. | 370/395.2 |
| 2005/0226174 | A1* | 10/2005 | Kiss | 370/282 |
| 2006/0045067 | A1 | 3/2006 | Dezonno et al. | |
| 2006/0077965 | A1 | 4/2006 | Garcia-Martin et al. | |
| 2006/0218268 | A1* | 9/2006 | Beck et al. | 709/224 |
| 2006/0251049 | A1 | 11/2006 | Grimminger et al. | |
| 2007/0143502 | A1 | 6/2007 | Garcia-Martin et al. | |
| 2007/0162599 | A1 | 7/2007 | Nguyen | |
| 2007/0220588 | A1 | 9/2007 | Panda et al. | |
| 2007/0250569 | A1 | 10/2007 | Mutikainen et al. | |
| 2007/0276907 | A1 | 11/2007 | Maes | |
| 2008/0022354 | A1* | 1/2008 | Grewal et al. | 726/1 |
| 2008/0046593 | A1 | 2/2008 | Ando et al. | |
| 2008/0080479 | A1 | 4/2008 | Maes | |
| 2009/0007219 | A1 | 1/2009 | Abzarian et al. | |
| 2009/0113067 | A1* | 4/2009 | Andreasen | 709/231 |
| 2009/0154451 | A1* | 6/2009 | Ku et al. | 370/389 |
| 2009/0175215 | A1 | 7/2009 | Chen et al. | |
| 2009/0238358 | A1* | 9/2009 | Ramanathan et al. | 379/221.03 |
| 2009/0320094 | A1* | 12/2009 | Kiss | 726/1 |
| 2010/0157985 | A1* | 6/2010 | Nakada et al. | 370/352 |
| 2010/0217855 | A1* | 8/2010 | Przybysz et al. | 709/223 |
| 2010/0293593 | A1* | 11/2010 | Lindholm et al. | 726/1 |
| 2011/0035442 | A1* | 2/2011 | Hjelm et al. | 709/203 |

FOREIGN PATENT DOCUMENTS

| | | |
|---|---|---|
| JP | 2004186753 A | 7/2004 |
| JP | 2005260571 A | 9/2005 |
| WO | 2004077742 A1 | 9/2004 |
| WO | 2007048013 A2 | 4/2007 |
| WO | 2009049684 A1 | 4/2009 |
| WO | WO 2009/049685 A1 * | 4/2009 |

OTHER PUBLICATIONS

Camarillo et al., "A Framework for Session Initiation Protocol (SIP) Session Policies", pp. 1-18, Oct. 16, 2005.*

H. Khartabil et al., IETF Internet Draft, Conveying a Session Policy Uniform Resource Identifier in the Session Initiation Protocol (SIP), , Feb. 2004, 8 pages.*

T. Berners Lee, et al., RFC 3986, Uniform Resource Identifier (URI): Generic Syntax, Network Working Group, Internet Society, 62 pages, Jan. 2005.*

Allen, Andrew, et al, U.S. Appl. No. 12/388,381, filed Feb. 18, 2009; Title: System and Method for Indicating Supported Session Policy URI Schemes Extensions.

Bakker, John-Luc, et al.; U.S. Appl. No. 12/388,386, filed Feb. 18, 2009; Title: System and Method for Resolving Extensions for the SIP Sesson Policy Framework.

Hilt, V., et al., "A Framework for Session Initiation Protocol (SIP) Session Policies," draft-ietf-sip-session-policy-framework-05; Sipping Working Group, Internet-Draft, Nov. 1, 2008, 36 pgs.

PCT International Search Report; PCT Application No. PCT/US2009/063811, Nov. 12, 2010; 4 pgs.

PCT Written Opinion of the International Searching Authority; CT Application No. PCT/US2009/063811, Nov. 12, 2010; 6 pgs.

Montemurro, Michael, et al.; U.S. Appl. No. 12/615,528, filed Nov. 10, 2009; Title: Method and System for Supporting SIP Session Policy Using Existing Authorization Architecture and Protocols.

Montemurro, Michael, et al.; U.S. Appl. No. 12/615,531, filed Nov. 10, 2009; Title: Methods and Aparatus for Providing Alternative Paths to Obtain Session Policy.

Montemurro, Michael, et al.; U.S. Appl. No. 12/615,532, filed Nov. 10, 2009; Title: Methods and Apparatus for Providing Indirect Alternative Paths to Obtain Session Policy.

3GPP TS 23.203 V7.7.0; 3rd Generation Partnership Project; Technical Specification Group Services and System Aspects; Policy and Charging Control Architecture; Release 7; Jun. 2008; 73 pgs.

3GPP TS 23.228 V8.5.0; 3rd Generation Partnership Project; Technical Specification Group Services and System Aspects; IP Multimedia Subsystem (IMS) Stage 2; Release 8; Jun. 2008; 240 pgs.

3GPP TS 24.229 V8.4.1; 3rd Generation Partnership Project; Technical Specification Group Core Network and Terminals; IP Multimedia Call Control Protocol Based on Session Initiation Protocol (SIP) and Session Description Protocol (SDP); Stage 3; Release 8; Jun. 2008; 518 pgs.

IEEE Standard, 802.16™, "IEEE Standard for Local and Metropolitan Area Networks, Part 16: Air Interface for Broadband Wireless Access Systems," IEEE Computer Society and IEEE Microwave Theory and Techniques Society, May 29, 2009, 77 pages.

IEEE Standard, 802.20™, "IEEE Standard for Local and Metropolitan Area Networks, Part 20: Air Interface for Mobile Broadband Wireless Access Systems Supporting Vehicular Mobility—Physical and Media Access Control Layer Specification," IEEE Computer Society, Aug. 29, 2008, 13 pages.

IEEE Standard, 802.11™, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications," IEEE Computer Society, Jun. 12, 2007, 48 pages.

Blunk, L., et al., "PPP Extensible Authentication Protocol (EAP)," Network Working Group, RFC 2284, Mar. 1998, 17 pgs.

Townsley, W., et al., "Layer Two Tunneling Protocol 'L2TP'," Network Working Group, RFC 2661, Aug. 1999, 90 pgs.

Rosenberg, J., et al., "An Offer/Answer Model with the Session Description Protocol (SDP)," Network Working Group, RFC 3264, Jun. 2002, 29 pgs.

Roach, A., "Session Initiation Protocol (SIP) —Specific Event Notification," Network Working Group, RFC 3265, Jun. 2002, 43 pgs.

Rosenberg, J., et al., "SIP: Session Initiation Protocol," Network Working Group, RFC 3261, Jun. 2002, 302 pgs.

Camarillo, G., et al., "Integration of Resource Management and Session Initiation Protocol (SIP)," Network Working Group, RFC 3312, Oct. 2002, 34 pgs.

Calhoun, P., et al., "Diameter Base Protocol," Network Working Group, RFC 3588, Sep. 2003, 165 pgs.

Aboba, B., et al., "The Network Access Identifier," Network Working Group, RFC 4282, Dec. 2005, 18 pgs.

Schulzrinne, H., et al., "CIPID: Contact Information for the Presence Information Data Format," Network Working Group, RFC 4482, Jul. 2006, 13 pgs.

Handley, M., et al., "SDP: Session Description Protocol," Network Working Group, RFC 4566, Jul. 2006, 55 pgs.

Kempf, J., et al., "Distributing a Symmetric Fast Mobile IPv6 (FMIPv6) Handover Key Using Secure Neighbor Discovery (SEND)," Network Working Group, RFC 5108, Jan. 2008, 16 pgs.

Aboba, B., et al., "Extensible Authentication Protocol (EAP) Key Management Framework," Network Working Group, RFC 5247, Aug. 2008, 89 pgs.

Office Action dated Apr. 2, 2012; U.S. Appl. No. 12/615,532, filed Nov. 10, 2009; 19 pages.

Office Action dated Mar. 23, 2012; U.S. Appl. No. 12/615,528, filed Nov. 10, 2009; 20 pages.

(56) References Cited

OTHER PUBLICATIONS

Mexican Office Action; Application No. MX/a/2011/004885; Feb. 24, 2012; 4 pages.
Hilt, V., et al.; "A Framework for Session Initiation Protocol (SIP) Session Policies"; draft-ietf-sip-session-policyframework-03; Apr. 27, 2008; 36 pages.
Final Office Action dated Feb. 4, 2013; U.S. Appl. No. 12/615,531, filed Nov. 10, 2009; 9 pages.
Notice of Allowance dated Apr. 16, 2013; U.S. Appl. No. 12/615,531, filed Nov. 10, 2009; 16 pages.
Australian Examination Report; Application No. 2009313216; Feb. 4, 2013; 3 pages.
Final Office Action dated Nov. 29, 2012; U.S. Appl. No. 12/615,532, filed Nov. 10, 2009; 23 pages.
Office Action dated Jun. 4, 2012; U.S. Appl. No. 12/615,531, filed Nov. 10, 2009; 15 pages.
Final Office Action dated Aug. 9, 2012; U.S. Appl. No. 12/615,528, filed Nov. 10, 2009; 17 pages.
Korean Office Action; Application No. 10-2011-7013105; Jul. 20, 2012; 7 pages.
Advisory Action dated Nov. 5, 2012; U.S. Appl. No. 12/615,528, filed Nov. 10, 2009; 3 pages.
Final Office Action dated Nov. 2, 2012; U.S. Appl. No. 12/615,531, filed Nov. 10, 2009; 20 pages.
Chinese Office Action; Application No. 200980144826.2; Jun. 28, 2013; 23 pages.
Japanese Office Action; Application No. 2011-535754; Jan. 8, 2014; 8 pages.
Office Action dated Dec. 20, 2013; U.S. Appl. No. 12/615,532, filed Nov. 10, 2009; 23 pages.
Australian Notice of Allowance; Application No. 2009313216; Dec. 10, 2013; 2 pages.
Chinese Office Action; Application No. 200980144826.2; Mar. 18, 2014; 25 pages.
Notice of Allowance dated Jun. 24, 2014; U.S. Appl. No. 12/615,532, filed Nov. 10, 2009; 13 pages.
Japanese Office Action as Received in Co-pending Application No. 2011-535754 on Jul. 29, 2014; 2 pages. (No English translation available).
3GPP TSG-S2#19; "PDP Contexts and Signalling Interactions"; S2-012107; Sophia Antipolis, France; Aug. 27-31, 2001; 11 pages.
ETSI TISPAN#2Bis; "Differences Between UMTS and xDSL Access Networks: Impact on SIP Profiles. (Additions to 02TD120)"; 02TD042; Sophia Antipolis; Feb. 23-27, 2004; 11 pages.
European Examination Report; Application No. 09761071.1; Nov. 13, 2014; 7 pages.

* cited by examiner

METHODS AND APPARATUS FOR PROVIDING SESSION POLICY DURING A REGISTRATION OF A DEVICE

CROSS-REFERENCE TO RELATED APPLICATIONS

The present application claims priority to U.S. provisional patent application No. 61/112,873, filed Nov. 10, 2008, by Michael Montemurro, et al, entitled "Method and System for Supporting SIP Session Policy Using Existing Authorization", which is incorporated by reference herein as if reproduced in its entirety.

BACKGROUND

The IP (Internet Protocol) Multimedia Subsystem (IMS) is a standardized architecture for providing multimedia services and voice-over-IP calls to both mobile and fixed user agents (UAs). The Session Initiation Protocol (SIP) been standardized and governed primarily by the Internet Engineering Task Force (IETF) as a signaling protocol for creating, modifying, and terminating IMS-based calls or sessions. As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as fixed line telephones, desktop computers, set-top boxes, or network nodes. When a UA is a network node, the network node could act on behalf of another function such as a UA or a fixed line device and simulate or emulate the UA or fixed line device. For example, for some UAs, the IMS SIP client that would typically reside on the device actually resides in the network and relays SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent," "UA," "user equipment," "UE," and "node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
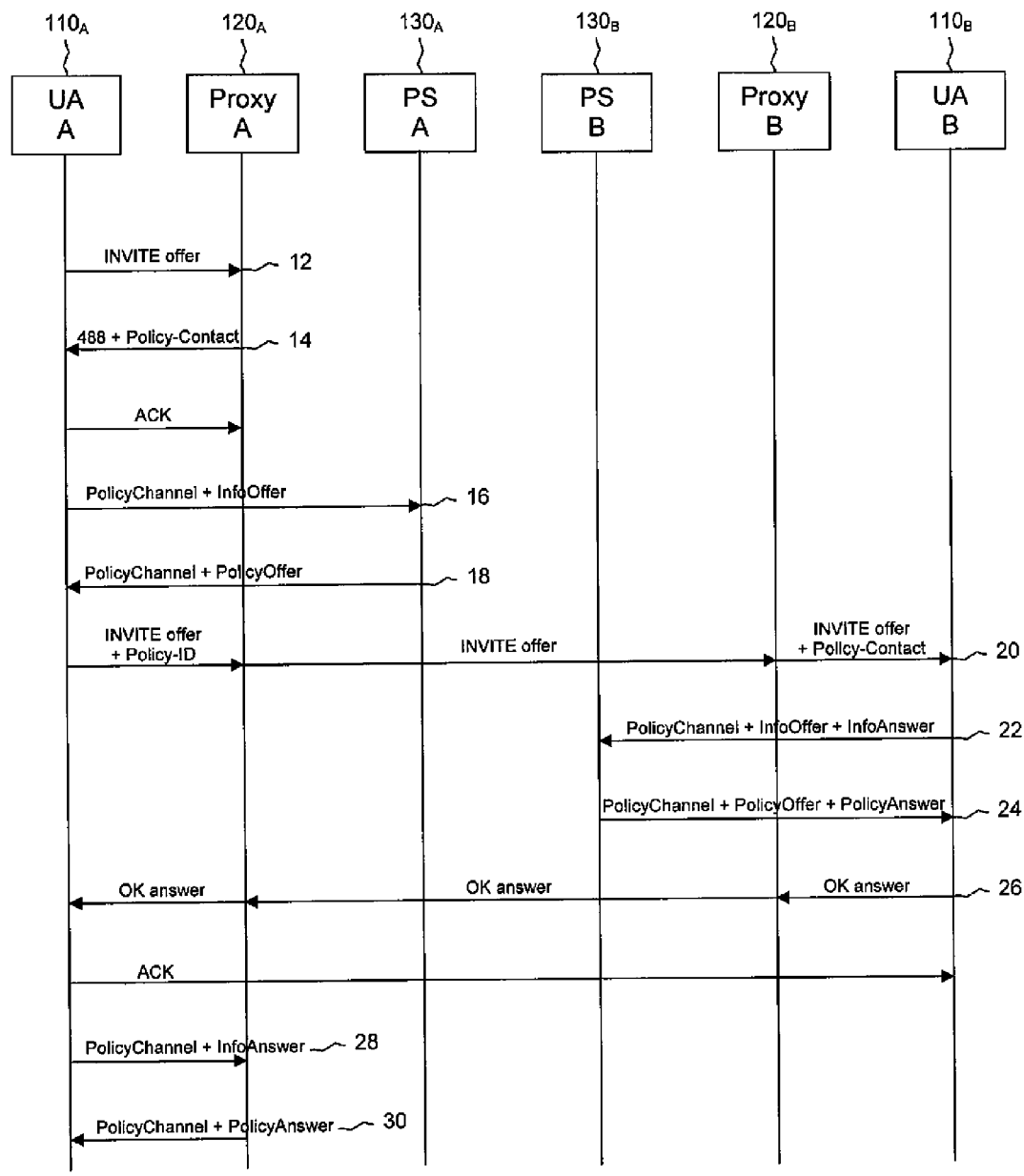
FIG. 1 is a flow diagram for establishment of a SIP session according to the prior art.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The SIP Request for Comments (RFC) 3261 is a signaling protocol for creating, modifying, and terminating multimedia sessions. A central element in SIP is the proxy server. Proxy servers are intermediaries that are responsible for request routing, rendezvous, authentication and authorization, mobility, and other signaling services. However, proxies are divorced from the actual sessions—audio, video, and session-mode messaging—that SIP establishes. Details of the sessions are carried in the payload of SIP messages and are usually described with the Session Description Protocol (SDP) RFC 4566 and RFC 3264.

Experience has shown that there is a need for SIP intermediaries to impact aspects of a session. Session parameters are typically controlled through the enforcement of session policies. For example, SIP can be used in a wireless network that has limited resources for media traffic. During periods of high activity, the wireless network provider could want to restrict the amount of bandwidth available to each user. With session policies, an intermediary in the wireless network can inform a UA about the bandwidth it has available. This information enables the UA to make an informed decision about the number of streams, the media types, and the codecs it can successfully use in a session. Similarly, a network provider can have a service level agreement with a user that defines the set of media types the user can use. The network can convey the current set of policies to user agents, enabling them to set up sessions without inadvertently violating any of the network policies.

In another example, a SIP UA is using a network which is connected to the public Internet through a firewall or a network border device. The network provider would like to tell the UA that it needs to send its media streams to a specific IP address and port on the firewall or border device to reach the public Internet. Knowing this policy enables the UA to set up sessions across the firewall or the network border. In contrast to other methods for inserting a media intermediary, the use of session policies does not require the inspection or modification of SIP message bodies.

Domains often have the need to enforce the session policies they have in place. For example, a domain might have a policy that disallows the use of video and can have an enforcement mechanism that drops all packets containing a video encoding. Unfortunately, these enforcement mechanisms usually do not inform the user about the policies they are enforcing. Instead, they silently keep the user from doing anything against them. This can lead to a malfunctioning of devices that is incomprehensible to the user. With session policies, the user knows about the current network policies and can set up policy-compliant sessions or simply connect to a domain with less stringent policies. Thus, session policies provide an important combination of consent coupled with enforcement. That is, the user becomes aware of the policy and needs to act on it, but the provider still retains the right to enforce the policy.

The IETF is defining a session policy framework in draft-sip-session-policy-framework-05 to enable the network to convey the current set of policies to SIP UAs, enabling them to set up sessions without inadvertently violating any of the network policies.

Two types of session policies, session-specific policies and session-independent policies, have been defined. Session-specific policies are policies that are created for one particular session, based on the description of the session. They enable a network intermediary to examine the session description a UA is proposing and to return a policy specifically for that session description. For example, an intermediary could open pinholes in a firewall/network address translation (NAT) for each media stream in the proposed session description. It can then return a policy for the session description that replaces the IP addresses and ports of the UA with the ones opened in the firewall/NAT that are reachable from external sources. Since session-specific policies are tailored to a session, they only apply to the session they are created for. Session-specific policies are created on a session-by-session basis at the time the session is established.

Session-independent policies, on the other hand, are policies that are created independently of a session and generally apply to all SIP sessions set up by a UA. A session-independent policy can, for example, be used to inform UAs about an existing bandwidth limit or media type restrictions. Since these policies are not based on a specific session description, they can be created independently of an attempt to set up a session and only need to be conveyed to the UA when it initializes (e.g., at the time the device is powered on) and when policies are changed.

The mechanisms described below can be used for both session-independent policies and session-specific policies. For session-specific polices (i.e., policies provided in response to a SIP request or SIP response), a PolicyOffer or PolicyAnswer document might be returned to a UA. For session-independent policies (i.e., policies provided to the UA prior to a session), a Session Policy document might be returned.

In addition to media policies, the mechanisms defined herein can be used to inform the UA to use a different IP address in the SDP Offer or Answer, to navigate firewalls or NATs, or to route media via a transcoder or other media relay.

The Third Generation Partnership Project (3GPP) has standardized the IP Multimedia Subsystem (IMS) as a Next Generation SIP/IP based network for multimedia services for mobile and landline networks. The architecture for 3GPP IMS is specified in 3GPP Technical Specification (TS) 23.228. In 3GPP TS 23.228, the functionality of IMS elements is specified, including the Serving Call Session Control Function (S-CSCF) and the Proxy Call Session Control Function (P-CSCF). The S-CSCF acts as both the SIP Registrar and as a SIP Proxy as defined in RFC 3261. The P-CSCF also acts as a SIP Proxy. The 3GPP IMS uses SIP for session signaling and, as described above, the IMS network entities (P-CSCF and S-CSCF) may need to impact aspects of a session (such as number of streams, the media types, and the codecs).

3GPP has defined the architecture for Policy and Charging Control (PCC) that performs the necessary Authorization and Accounting functions for UA access to IMS bearer resources. The PCC architecture includes a policy server, the PCRF (Policy Control and Charging Rules function), which, based on inputs from various sources, determines which UAs are allowed bearer access based on the attributes and characteristics of the session (such as the number of streams, the media types, and the codecs). The PCRF interfaces to the Subscription Profile Repository (SPR) for subscription-based policies and to the Application Function (AF) for application-specific inputs. When IMS is used with PCC, the AF is a SIP proxy, the P-CSCF, that can influence the PCRF based on the SIP Session Signaling. The PCRF interfaces to the Policy Control Enforcement Function (PCEF) that provides gating and filtering functions to ensure that the policy is enforced. The PCEF is integrated with the Access Network specific gateway (e.g., GGSN, PDG, PDSN, or CMTS). These entities might communicate using the DIAMETER or RADIUS protocol and form part of the Authentication Authorization Accounting (AAA) infrastructure. It should be understood that a policy server as described herein is not limited to the PCRF. Other embodiments are possible, such as a policy server integrated with the P-CSCF.

Currently, 3GPP has defined in TS 24.229 a session policy policing mechanism for IMS based on the SIP proxies sending a SIP 488 response if the original SIP INVITE request contains media types or codecs that network policies do not allow. As specified in RFC 3261 and 3GPP TS 24.229, the 488 response contains SDP descriptions of the media types and codecs that would be allowed so that the calling UA can retry the request with SDP that would be allowed. However, this approach has the problem that, as the SIP request traverses each domain, every domain may have its own set of policies. It is quite possible in roaming situations that a single SIP request can traverse four or more different IMS domains and potentially have a SIP 488 response sent back by each domain. Potentially, each proxy in each domain could have to reject the SIP INVITE request with a SIP 488 response, resulting in the calling UA having to send five (or even more)

SIP INVITE requests (and receive four or more SIP 488 responses) before the SIP INVITE request reaches the called UA. This results in a severely delayed session setup.

Also, this mechanism does not work for SIP INVITE requests that do not contain SDP, which is allowed in RFC 3261, where an initial SIP INVITE without SDP can be sent and the called UA can then send back the SDP offer in the response, with the calling party then returning the SDP answer in the ACK request. A response cannot be rejected with a 488 response since a SIP response can only be sent in response to a request. Therefore, 3GPP IMS has restricted the use of these offerless SIP INVITE requests by allowing them to come only from network servers (that are aware of the policies) and from outside IMS networks where they may happen, in which case, if the session is established with codecs contrary to policies, it is immediately terminated with a BYE. This situation is not satisfactory.

Additionally, the 3GPP PCC architecture depends on the P-CSCF analyzing the SDP from the SIP signaling to provide input into the PCRF for the authorization of bearer resources for the session. For the called UA, the SDP answer sent in a response is required by the P-CSCF in order to authorize the bearer resources based on the media types and codecs accepted by the called UA. This means that the called UA often needs to send a provisional (1xx) response containing the SDP answer earlier than it would otherwise have sent an answer. Since IMS uses the preconditions framework RFC 3312, this provisional response needs to be sent reliably. This can require a further SIP PRACK request and 200OK response to be exchanged as well, which results in a considerably delayed call setup time due to the additional unnecessary SIP messages needing to be exchanged end to end.

FIG. 1 is a flow diagram from draft-sip-session-policy-framework-05 that illustrates the basic IETF SIP architecture of the session policy framework with SIP session establishment. At event 12, a first $UA_A$ $110_A$ sends a SIP INVITE message containing an SDP offer to a first $proxy_A$ $120_A$. At event 14, the first $proxy_A$ $120_A$ sends a 488 message including a Policy-Contact header to the first $UA_A$ $110_A$. The first $UA_A$ $110_A$ then returns an acknowledgement message to the first $proxy_A$ $120_A$. At event 16, the first $UA_A$ $110_A$ sends a Policy-Channel message containing an InfoOffer to a first policy $server_A$ $130_A$. At event 18, the first policy $server_A$ $130_A$ sends a PolicyChannel message containing a PolicyOffer to the first $UA_A$ $110_A$.

At event 20, the first $UA_A$ $110_A$ sends an INVITE message containing an SDP offer to a second $UA_B$ $110_B$ via the first $proxy_A$ $120_A$ and a second $proxy_B$ $120_B$. At event 22, the second $UA_B$ $110_B$ sends a PolicyChannel message containing an InfoOffer and an InfoAnswer to a second policy $server_B$ $130_B$. At event 24, the second policy $server_B$ $130_B$ sends a PolicyChannel message containing a PolicyOffer and a PolicyAnswer to the second $UA_B$ $110_B$. At event 26, the second $UA_B$ $110_B$ sends a SIP 200OK answer to the first $UA_A$ $110_A$ via the second $proxy_B$ $120_B$ and the first $proxy_A$ $120_A$. The first $UA_A$ $110_A$ then returns a SIP Acknowledgement (ACK) message to the second $UA_B$ $110_B$. At event 28, the first $UA_A$ $110_A$ sends a PolicyChannel message containing an InfoAnswer to the first $proxy_A$ $120_A$. At event 30, the first $proxy_A$ $120_A$ sends a PolicyChannel message containing a PolicyAnswer to the first $UA_A$ $110_A$.

Figure 2:
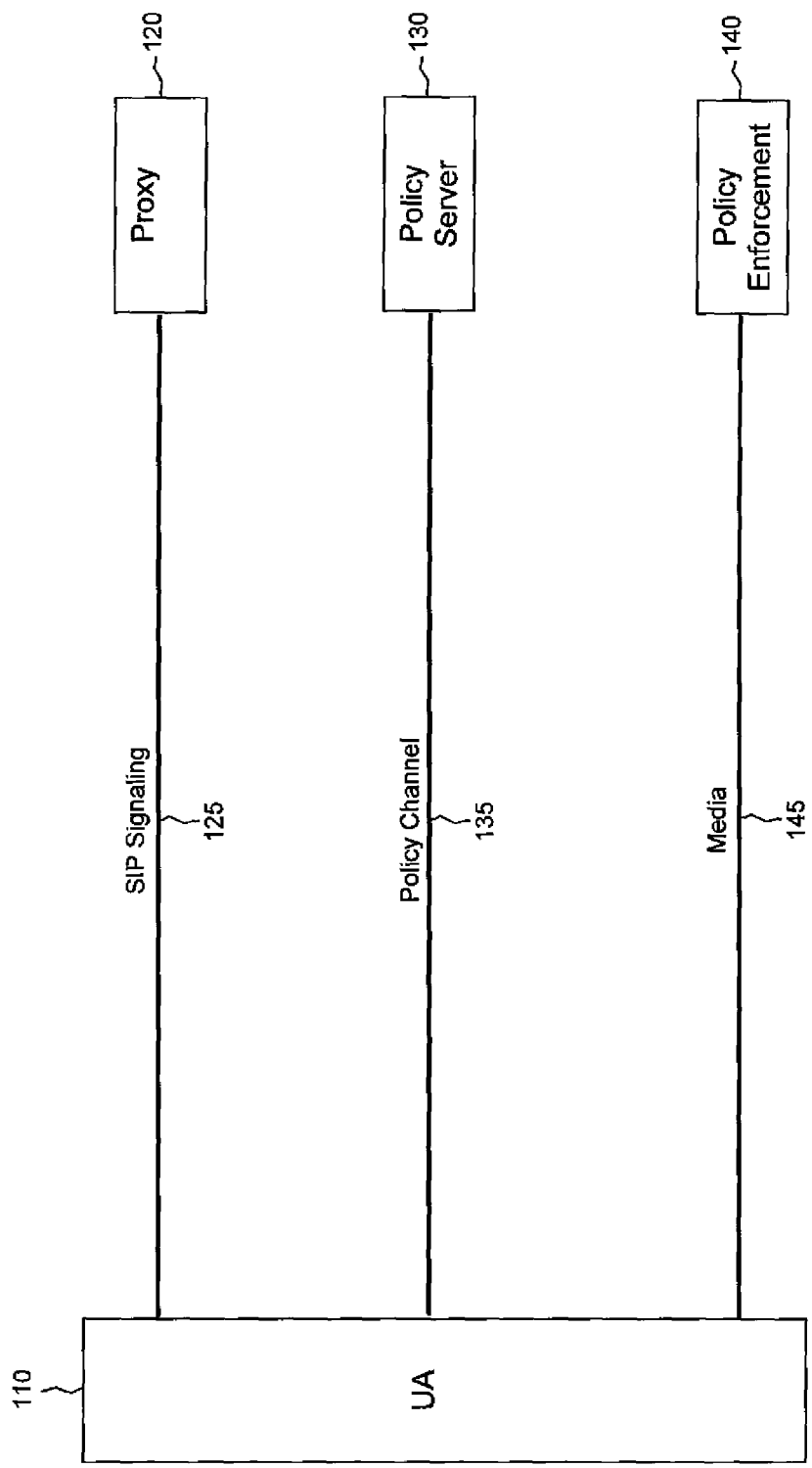
FIG. 2 is a diagram of a policy architecture according to the prior art.

The following entities are typically needed for session-specific policies: a UA, a proxy, a policy server, and possibly a policy enforcement entity. A policy architecture for these entities is illustrated in FIG. 2. The UA 110 communicates with the proxy 120 via SIP signaling 125 and communicates with the policy server 130 via a policy channel 135. Media 145 might be exchanged between the UA 110 and a policy enforcement component 140.

The proxy 120 provides a rendezvous mechanism for UAs 110 and policy servers 130. It ensures that each UA 110 obtains the Uniform Resource Identifier (URI) of the policy server 130 in its domain and knows where to retrieve policies from. The proxy 120 conveys the policy server URI to the UAs 110 in case they have not yet received it (e.g., in a previous call or through other means such as configuration). The proxy 120 does not deliver the actual policies to the UA 110. Instead, the proxy 120 provides the UA 110 with a URI or other identifier for the policy server 130 from which the UA 110 can retrieve a policy document or other policy information.

The policy server 130 is a separate logical entity that can be physically co-located with the proxy 120. The role of the policy server 130 is to deliver session policies to the UA 110. The policy server 130 receives session information from the UA 110, uses this information to determine the policies that apply to the session, and returns these policies to the UA 110.

The Session Policies framework defines the SIP Policy-Contact header (which can be included by the proxy 120 in the SIP requests and responses) as the mechanism by which the UA 110 receives the URI of a policy server 130 from a proxy 120. That is, the proxy 120 can add the URI of the policy server 130 to the Policy-Contact header. The UA 110 uses this URI to contact the policy server 130 and provides information (including Session Descriptions (SDP)) about the current session to the policy server 130. The UA 110 then receives session policies from the policy server 130 in response. The UA 110 can also receive policy updates from the policy server 130 during the course of a session. The communication exchange between the UA 110 and the policy server 130 is defined as the policy channel 135.

The current Session Policies framework defines a SIP-based mechanism based only upon the SIP Events framework RFC 3265 and the Event Package defined in draft-ietf-sip-ping-policy-package-05 to deliver the session policy to the UA 110 using the policy channel 135 and currently defines only SIP and SIPS URIs as the URIs that can be included by the proxy 120 in the SIP Policy-Contact header. Full details of the Session Policies framework are defined in draft-sip-session-policy-framework-05.

Figure 3:
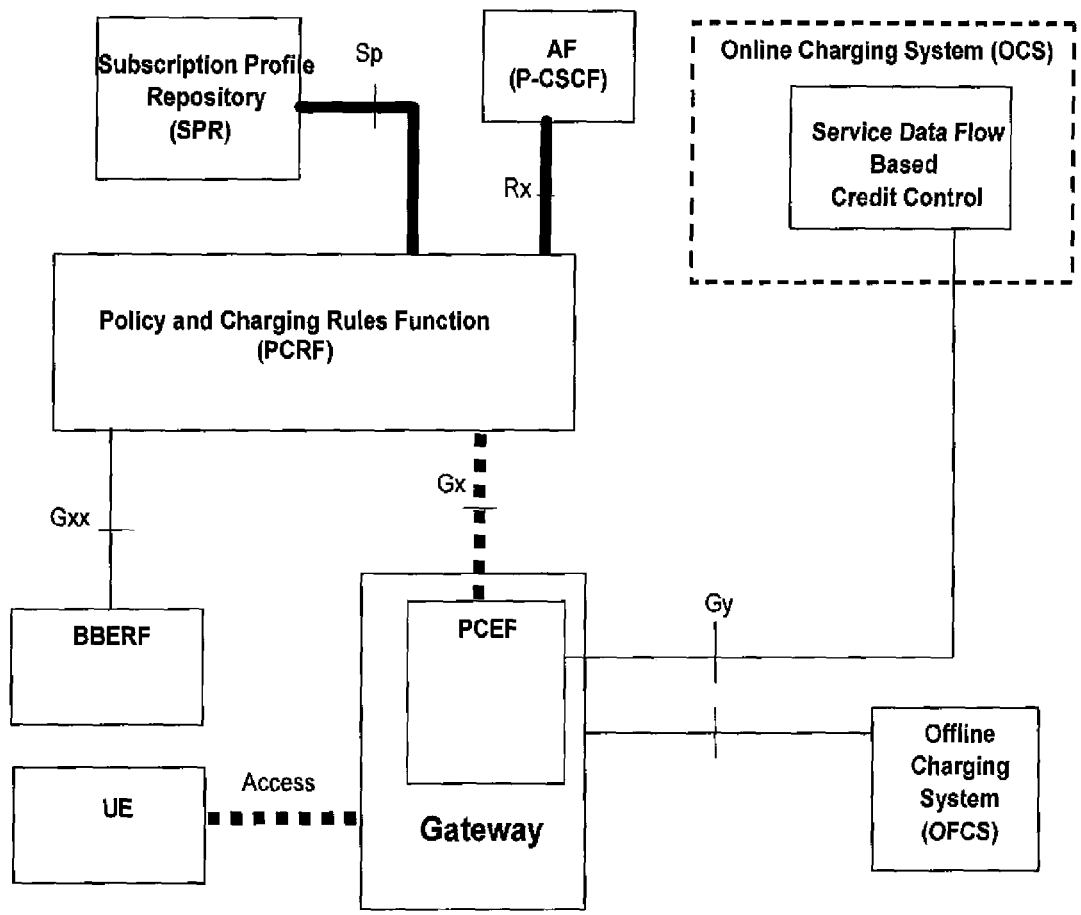
FIG. 3 is an illustration of a policy and charging control architecture according to the prior art.

3GPP has defined the Policy and Charging Control (PCC) Architecture in TS 23.203 as shown in FIG. 3. In the figure, the Policy and Charging Rules Function (PCRF) is the Policy Server. The thick dashed lines show the reference points over which the Policy Channel as defined in draft-sip-session-policy-framework-05 needs to operate. The Subscription Profile Repository (SPR) also contains subscription-related polices, but these are incorporated into the PCRF policies by the PCRF. TS 23.203 also supports other configurations with visited PCRFs for roaming scenarios, but in these cases a single PCRF interfaces to the other policy servers. The Policy Charging Enforcement function is incorporated into the IP Connectivity Access Network (IP-CAN)-specific gateway (e.g., GGSN, PDG, CMTS). In 3GPP IMS, the P-CSCF implements the AF (Application Function) functionality. The AF communicates with the PCRF via the Rx reference point. In 3GPP IMS, the P-CSCF interacts with the PCRF in order to authorize the bearer resources for the IMS SIP session. The PCRF uses the P-CSCF information as one of the criteria for determining the policy that the PCEF applies to the session bearer. The Gx reference point utilizes DIAMETER as the protocol for communicating between the PCEF and the PCRF. Likewise, DIAMETER is the protocol used on the Rx reference point between the P-CSCF and the PCRF.

The SIP Events framework RFC 3265 provides a good general solution since it is independent of the underlying policy and network architecture and it ensures that all SIP UAs 110 will be able to interact with all policy servers 130. However, for limited bandwidth networks, such as GSM (Global System for Mobile Communications), UMTS (Universal Mobile Telecommunications System), CDMA (Code Division Multiple Access), and E-UTRAN (Evolved UMTS Terrestrial Radio Access Network), the SIP Events framework RFC 3265 is extremely heavy for transferring the session policy to the UAs 110 during session setup. At a minimum, the SIP Events framework requires the following SIP messages to be sent to obtain the session policy: a SIP SUBSCRIBE message, a SIP 200OK message, a SIP NOTIFY message, and another SIP 200OK message.

In addition, these messages, especially the SUBSCRIBE message and the NOTIFY message, are large, text-based messages that also include the overhead of the IP and UDP headers. Therefore, the messages could be hundreds of bytes in size. The NOTIFY message might be particularly large since it contains the Extensible Markup Language (XML)-encoded policy document.

Thus, in the scenario shown in the session policy flow diagram in FIG. 1, twelve SIP messages are required for the three policy channel interactions using SIP Events on the policy channel, in addition to the nine SIP Session Signaling messages needed to establish the session. Thus, the SIP signaling overhead of using the SIP Events framework is greater than the SIP signaling required for the SIP session establishment. Not only is this a waste of signaling bandwidth, but in limited bandwidth networks such as cellular, with signaling channels of only a few thousand kilobits per second, this could cause a significant delay in the session setup.

Also, the SIP Events framework is stateful, which means that it establishes a SIP dialog. This can place a significant load on the network infrastructure entities. Also, policy servers 130 traditionally have not implemented SIP but have used other protocols such as AAA (RADIUS and DIAMETER) for transferring policies.

The large number of round trip SIP messages that need to be sent under this scenario and the large size of the messages and the policy document can result in an unacceptably inefficient mechanism that can consume a great deal of overhead. Not only is this a waste of signaling bandwidth, this could cause a significant delay in session setup.

In an embodiment, instead of SIP or SIPS URIs, where a 3GPP PCC or similar AAA infrastructure has been deployed, AAA URIs or similar URIs are provided in the Policy-Contact header. That is, a communication path that is at a lower layer than the SIP messaging layer is created between a UA and a policy server and is used as a policy channel. The UA can send the policy server a session policy request over this policy channel using a lower layer protocol. In some cases, the lower layer protocol might be the DIAMETER protocol or the RADIUS protocol using the Extensible Authentication Protocol (EAP). Whereas EAP is described, one of ordinary skill may choose other protocols such as, but not limited to, Point to Point Protocol (PPP), etc. In other cases, the lower layer protocol creates a data bearer channel between the wireless device and the network. For example, the wireless device might send a message to the network containing information to create a data channel. This might be a General Packet Radio Service (GPRS) Activate Packet Data Protocol (PDP) which is communication from the wireless device to a network node called SGSN. In an LTE environment, the lower layer protocol in the ESM messages might be, but is not limited to, a PDN_CONNECTIVITY_REQUEST or a BEARER_RESOURCE_MODIFICATION_REQUEST that could be tunneled and/or piggy-backed in an ATTACH message from the wireless device to the MME or as separate default messages. As per RFC 3588 the following are examples of valid DIAMETER or RADIUS host identities:

---
aaa://host.example.com
aaa://host.example.com:6666.
---

Alternatively instead of using an AAA URI a new URI format could be defined for MPDF, such as MPDF URI "mpdf:" or "mpdfeap:". Other URI syntaxes are also possible.

Figure 4:
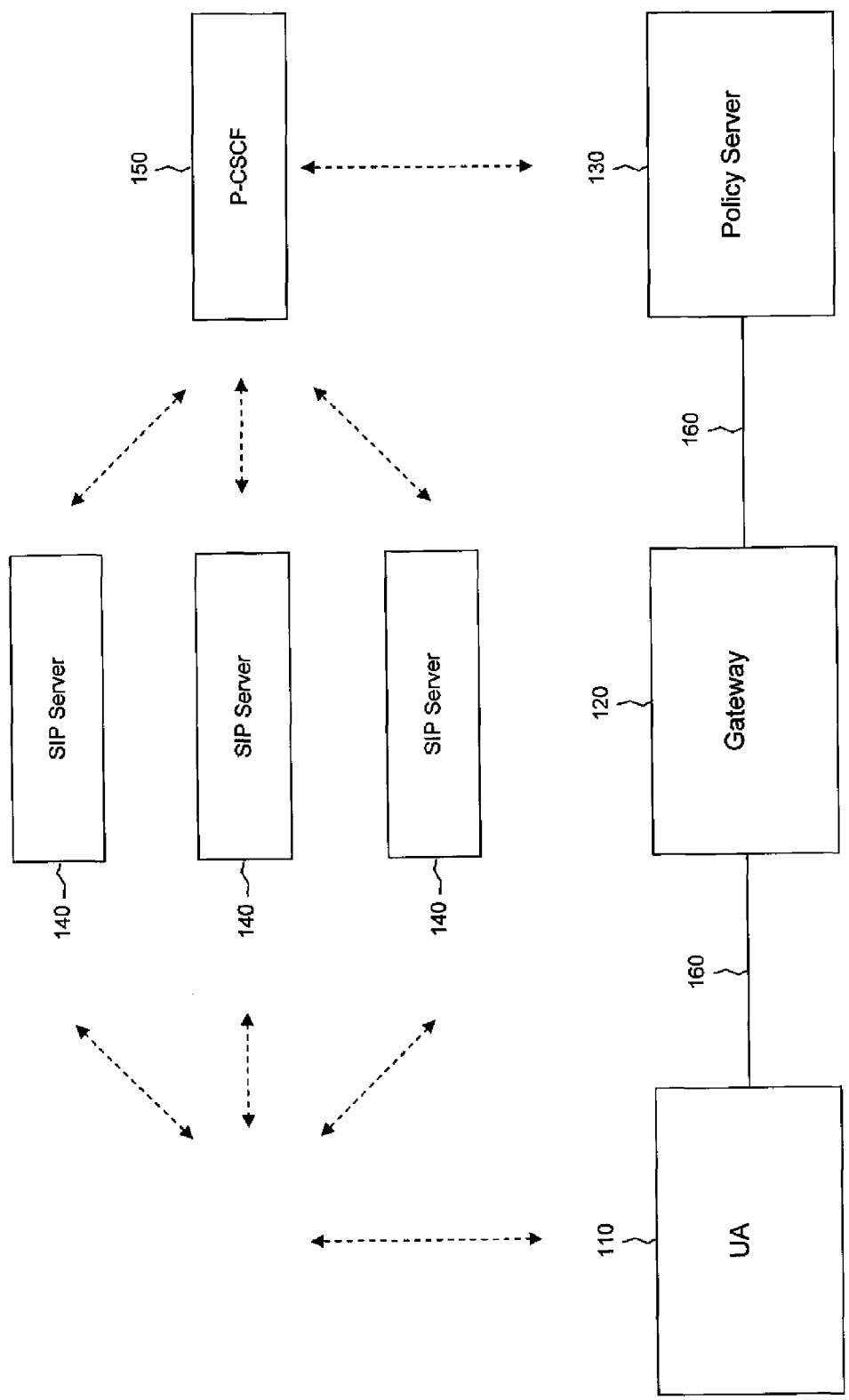
FIG. 4 is an illustration of a telecommunications system according to an embodiment of the disclosure.

FIG. 4 illustrates a system in which session policy requests and policy documents can be sent in such a manner that the UE implements EAP (Extensible Authentication Protocol) and uses EAP to implement the policy channel protocol with the PCRF. A UA 110 can connect to a network node of a first type, which might be a gateway, an access point, a network access server, a proxy, or another component with substantially equivalent capabilities. Hereinafter, this component will be referred to as a gateway 120. The gateway 120 might include a Policy Charging Enforcement Function (PCEF). Hereinafter, references to the gateway 120 might refer to the gateway 120 alone, the PCEF alone, or the gateway 120 in combination with the PCEF.

The UA 110 can send session policy requests to the gateway 120 via the EAP protocol or a similar, lower layer protocol. The gateway 120 can connect to a network node of a second type, which might be a policy server, a policy and charging rules function, an authentication server, or a similar component. In some embodiments, this component can be a stand alone element. In other embodiments, this component can be combined with another component such as a SIP proxy, including the P-CSCF. Hereinafter, this component will be referred to as a policy server 130. Although only one policy server 130 is shown, multiple policy servers could be present. The gateway 120 can send session policy requests to the policy server 130 via the RADIUS protocol, the DIAMETER protocol, or some other lower layer protocol with substantially equivalent capabilities. The state of the art procedures discussed previously for sending session policy requests and receiving policy documents are depicted by dashed lines in FIG. 4.

In the process of authenticating the UA 110, a lower layer communication path 160 is created between the UA 110 and the policy server 130, via the gateway 120. This path 160 can be used as the policy channel. The various technologies by which an EAP-based request can be transported from the UA 110 to the gateway 120 can have a RADIUS- or DIAMETER-based infrastructure that can transport EAP frames. Therefore, an EAP-based request can be transported from the UA 110, via the gateway 120, to the policy server 130, and an EAP-based response can be transported from the policy server 130 to the UA 110.

In an embodiment, the policy channel 160 is used to send a session policy request from the UA 110 to the policy server 130 and to deliver a policy document or other policy information from the policy server 130 to the UA 110. The policy channel 160 can be a replacement for the Policy Channel mechanism based on the Subscribe and Notify mechanisms defined in the draft-ietf-sip-session-policy-framework draft. More specifically, one or more EAP frames might be transported over an IP-CAN (IP (Internet Protocol) Connectivity Access Network) via IKEv2 (Internet Key Exchange version 2) over IP per RFC 5108 between the UA 110 and the gateway 120. Alternatively, other transport protocols could be used, such as transporting EAP over PPP (Point-to-Point Protocol) as per RFC 2284, wired IEEE 802 LANs (IEEE-802.1X), IEEE 802.11 wireless LANs (IEEE-802.11), UDP (L2TP [RFC2661] and IKEv2 [IKEv2]), and TCP (PIC). Other transport protocols are also possible. In any of these transport protocols, messages are sent at a lower protocol layer than the SIP messages, which are typically sent at the application layer.

In some embodiments, the type-length-value (TLV) structure allowed in EAP might be used to insert a query that requests the policy document. In other embodiments, the policy contact URI can be appended to any NAI per RFC 4482 that has been used to identify the user. The policy server address could also be encrypted by a shared key between the SIP UA and the home AAA server that handles the EAP frames. This allows the policy address to be kept secret from any intermediate nodes.

In an embodiment, the gateway 120 forwards the EAP frames over the Gx reference point to the policy server 130 using DIAMETER. In other embodiments, RADIUS or a similar protocol might be used. The EAP frames can transport policy channel documents such as session information documents between the UA 110 and the gateway 120 and the policy server 130. The session information documents might be InfoOffer, InfoAnswer, and/or other documents as defined in the draft-ietf-sip-session-policy framework and related documents or future extensions. The UA 110 can gain access to the policy server 130 to obtain the policy document based on a policy contact URI (Uniform Resource Indicator) provided in the Policy-Contact header or a new header that could be called, but is not limited to being called, a Policy-Contact header. The policy server 130 can then return a policy document or other policy information to the UA 110. The policy information might be returned along the same path using the same protocol as the request, along the same path using a protocol different from that used on the request, along a different path from that used on the request, or in some other manner. For session-specific policies, if the session policies change during a session (because of a change in the available radio resources, for example), the policy server 130 can send a modified policy document to the UA 110 using the same DIAMETER and EAP protocols.

Figure 5:
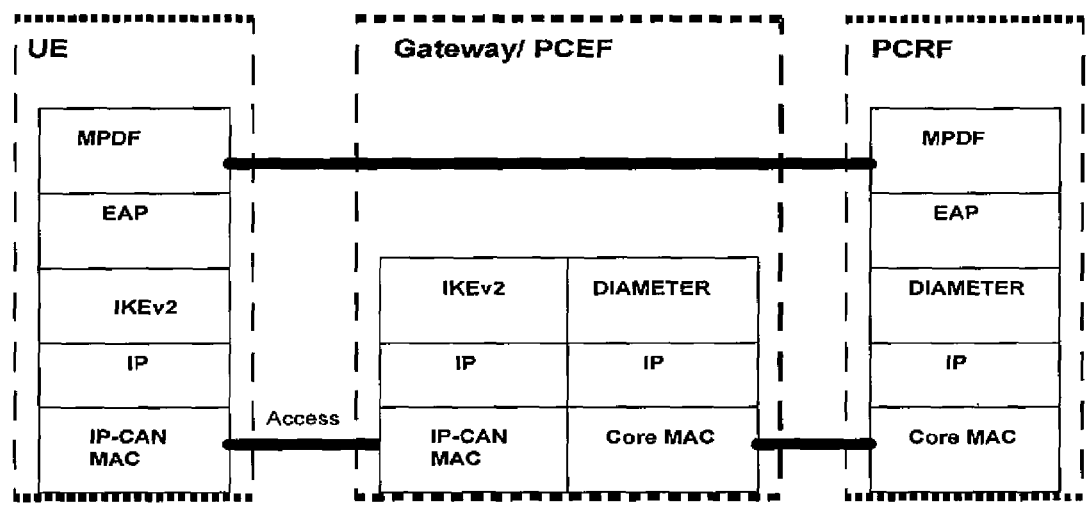
FIG. 5 is an illustration of a protocol stack according to an embodiment of the disclosure.

FIG. 5 shows an embodiment of a proposed protocol stack for transporting media policy documents over EAP and IP between a UA and a DIAMETER-based PCRF via an IP-CAN access gateway.

When the embodiments described herein are implemented, the number of round trip messages needed for the UA 110 to request and receive a policy document can be greatly reduced compared to the plurality of SIP messages that were used in the SIP scenario described above. Also, EAP-based session policy requests can be significantly smaller than some of the SIP messages described above. For example, the overhead of a SIP message is typically around 500 to 1000 bytes. The overhead of an EAP-based message, on the other hand, is typically around 50 bytes.

In addition, in an embodiment, the policy document can be converted to binary to make it smaller, and this smaller policy document can be sent to the UA 110, rather than the large, XML-based policy document that is sent in the SIP-based method. The XML content of the session policy documents could be compressed into binary form by a number of methods known in the art. One example would be XML Infoset, as specified in ITU-T Rec. X.891.

3GPP has as an objective that authorization requests for media not be linked with SIP signaling. The session policy requests described herein use EAP-based messages to request authorization to obtain media and therefore can accomplish this decoupling of SIP signaling from the authorization policy for media.

In addition, EAP-based session policy requests are access network agnostic. That is, the UA 110 might connect to the gateway 120 via one or more of several different wireless or wired communication technologies such as GPRS (which might include GSM, EDGE, UTRAN, and/or E-UTRAN), 3GPP UTRAN, 3GPP2 CDMA, 802.11x MAN, 802.16 WiMAX, 802.20 MAN, DOCSIS (Data Over Cable Service Interface Specification), and/or TISPAN (Telecoms and Internet converged Services and Protocols for Advanced Networks) NASS/RACS (Network Attachment Sub-System/Resource and Admission Control System). Since these architectures typically rely on DIAMETER-based or RADIUS-based policy servers, the UA 110 can submit EAP-based session policy requests to the gateway 120 as described herein, regardless of which of these access networks the UA 110 uses to connect to the gateway 120.

Figure 6:
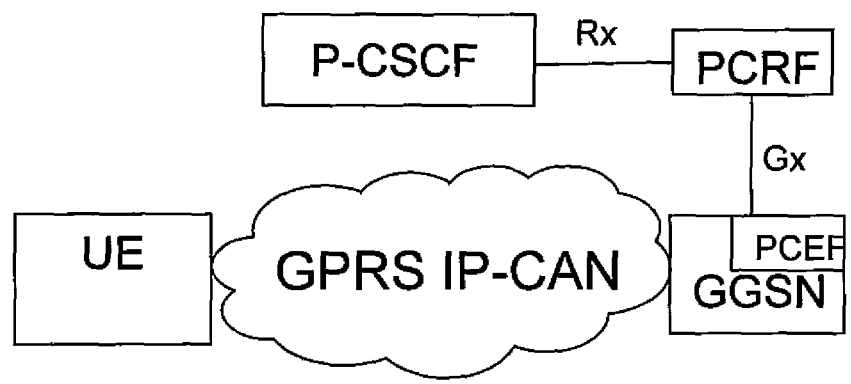
FIG. 6 is an illustration of an access network according to an embodiment of the disclosure.

FIG. 6 depicts an example of how session policy requests might be handled when the UA 110 (which is referred to in FIGS. 6 through 12 as the UE) uses a GPRS (GSM/EDGE/UTRAN/E-UTRAN) IP-CAN. 3GPP cellular access (GSM/EDGE/UTRAN/E-UTRAN) to IMS uses GPRS. For GPRS, the IP-CAN bearer is the PDP context. In GPRS, the gateway is the GGSN and the PCEF is collocated with the GGSN. The Gx reference point between the PCEF and the PCRF and the Rx reference point between the P-CSCF and the PCRF use DIAMETER.

In this access network scenario, EAP frames from the UE containing the Policy channel InfoOffer and InfoAnswer messages would be transported over IKEv2 over IP or alternatively over PPP to the GGSN. The EAP frames containing the Policy channel InfoOffer and InfoAnswer messages would then be routed over DIAMETER using the Gx reference point to the PCRF. The PCRF would then, based on the Policy Info contained in the InfoOffer or InfoAnswer messages from the UE, the policies installed in the PCRF, subscriber policies fetched from the SPR, service based authorization policies installed by the P-CSCF via Rx, and knowledge of the access network the UE is using and its available resources, generate a Media policy document. The PCRF will send the Media policy document in a PolicyOffer or Policy Answer message in EAP frames over Gx to the GGSN that then forwards to the UE in EAP transported over IKEv2 over IP or alternatively over PPP to the UE. Other scenarios are also possible.

Figure 7:
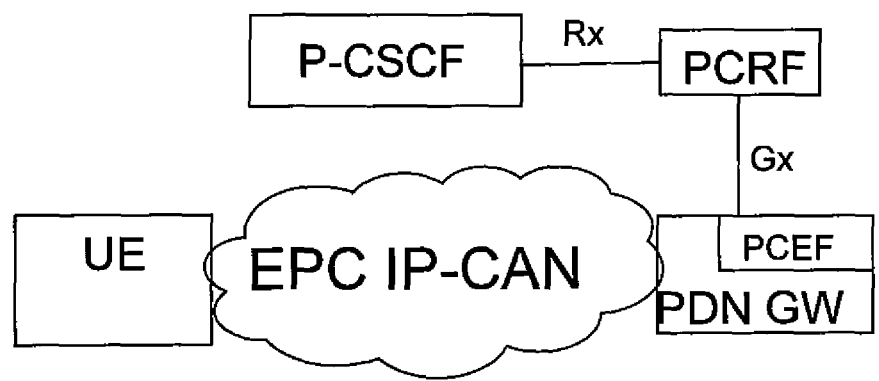
FIG. 7 is an illustration of another access network according to an embodiment of the disclosure.

FIG. 7 depicts an example of how session policy requests might be handled when the UE uses a 3GPP E-UTRAN or other non-3GPP access with Enhanced Packet Core (EPC) IP-CAN. 3GPP E-UTRAN and other non 3GPP accesses can use the Enhanced Packet Core (EPC) to access IMS. For EPC, the IP-CAN bearer is the PDP context enhanced from GPRS or Proxy Mobile IP (PMIP). In EPC, the gateway is the PDN GW and the PCEF is collocated with the PDN GW. The Gx reference point between the PCEF and the PCRF and the Rx reference point between the P-CSCF and the PCRF use DIAMETER.

In this access network scenario, EAP frames from the UE containing the Policy channel InfoOffer and InfoAnswer messages could be transported over IKEv2 over IP to the PDN GW. Alternatively, the channel InfoOffer could be tunneled, piggybacked, or transported in an ESM message such as PDN CONNECTIVITY REQUEST or, in the case where an ESM message has not been included in the ATTACH message from the wireless device, the InfoOffer could be transported via MME to the PDN GW. The EAP frames containing the Policy channel InfoOffer and InfoAnswer messages or the messages from the MME to the PDN that create the EPC bearer channel containing, for example, the Create Session Request containing the InfoOffer and Create Session Response containing the InfoAnswer messages would then be routed over DIAMETER using the Gx reference point to the PCRF. The PCRF would then generate a media policy document based on the Policy Info contained in the InfoOffer or InfoAnswer messages from the UE, the policies installed in the PCRF, subscriber policies fetched from the SPR, service based authorization policies installed by the P-CSCF via Rx, and/or knowledge of the access network the UE is using and its available resources. The PCRF will send the media policy document in a PolicyOffer or Policy Answer message in EAP frames over Gx to the PDN GW that then forwards to the UE in EAP transported over IKEv2 over IP to the UE or via a Create Session Response containing the Policy Answer.

Figure 8:
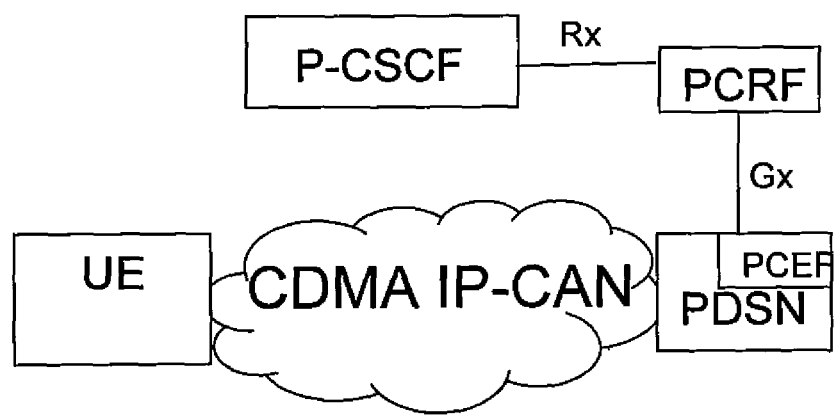
FIG. 8 is an illustration of another access network according to an embodiment of the disclosure.

FIG. 8 depicts an example of how session policy requests might be handled when the UE uses a 3GPP2 CDMA IP-CAN. 3GPP2 cellular access (CDMA-1x, CDMA EVDO) to IMS uses mobile IP. In 3GPP2 CDMA, the gateway is the PDSN and the PCEF is collocated with the PDSN. The Gx reference point between the PCEF and the PCRF and the Rx reference point between the P-CSCF and the PCRF use DIAMETER.

In this access network scenario, EAP frames from the UE containing the Policy channel InfoOffer and InfoAnswer messages would be transported over IKEv2 over IP to the PDSN. The EAP frames containing the Policy channel InfoOffer and InfoAnswer messages would then be routed over DIAMETER using the Gx reference point to the PCRF. The PCRF would then generate a media policy document based on the Policy Info contained in the InfoOffer or InfoAnswer messages from the UE, the policies installed in the PCRF, subscriber policies fetched from the home network (such as from the SPR or the home PCRF or another policy server in the home network), service based authorization policies installed by the P-CSCF via Rx, and/or knowledge of the access network the UE is using and its available resources. The PCRF will send the Media policy document in a PolicyOffer or Policy Answer message in EAP frames over Gx to the PDSN that then forwards to the UE in EAP transported over IKEv2 over IP to the UE.

Figure 9:
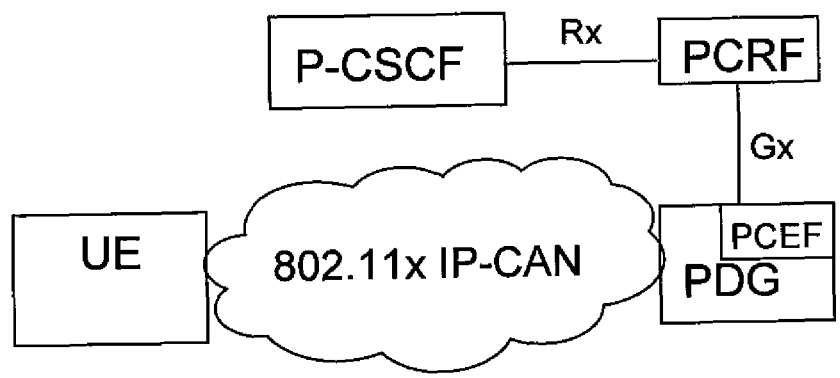
FIG. 9 is an illustration of another access network according to an embodiment of the disclosure.

FIG. 9 depicts an example of how session policy requests might be handled when the UE uses an 802.11x WLAN IP-CAN. In 802.11x WLAN access to IMS the gateway is the PDG and the PCEF is collocated with the PDG. The Gx reference point between the PCEF and the PCRF and the Rx reference point between the P-CSCF and the PCRF use DIAMETER.

In this access network scenario, EAP frames from the UE containing the Policy channel InfoOffer and InfoAnswer messages would be transported over IKEv2 over IP or alternatively over 802.1x to the PDG. The EAP frames containing the Policy channel InfoOffer and InfoAnswer messages would then be routed over DIAMETER using the Gx reference point to the PCRF. The PCRF would then, based on the Policy Info contained in the InfoOffer or InfoAnswer messages from the UE, the policies installed in the PCRF, subscriber policies fetched from the SPR, service based authorization policies installed by the P-CSCF via Rx, and knowledge of the access network the UE is using and its available resources, generate a Media policy document. The PCRF will send the Media policy document in a PolicyOffer or Policy Answer message in EAP frames over Gx to the PDG that then forwards to the UE in EAP transported over IKEv2 over IP to the UE.

Figure 10:
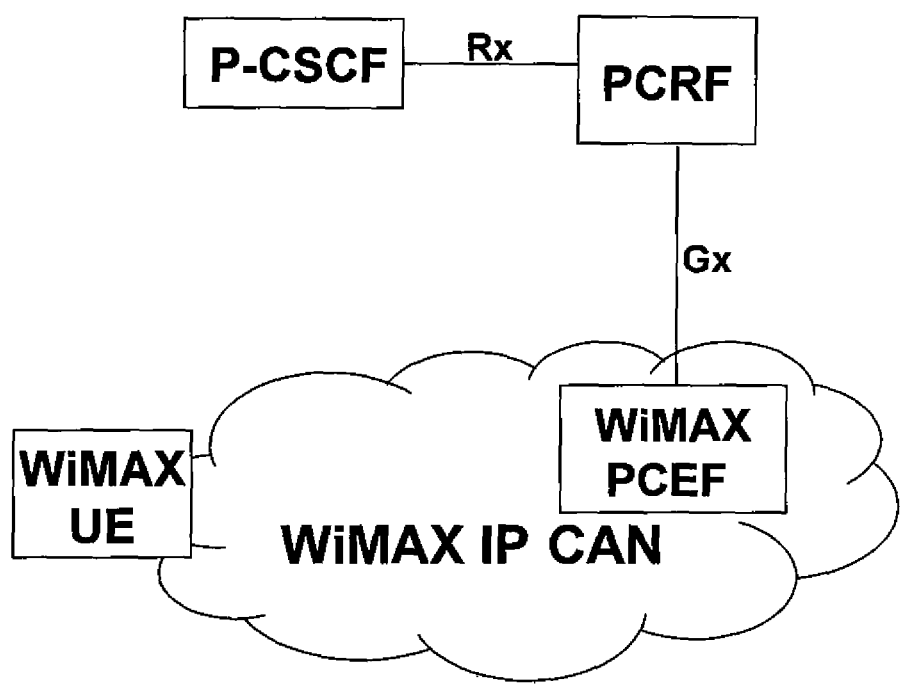
FIG. 10 is an illustration of another access network according to an embodiment of the disclosure.

FIG. 10 depicts an example of how session policy requests might be handled when the UE uses a WiMAX/802.16 IP-CAN. In the WiMAX IP-CAN, the UE (also referenced as Mobile Station or MS in IEEE 802.16 standards) connects to the WiMAX Access Service Network (ASN). The ASN logically communicates with a Connectivity Service Network (CSN) which is a collection of core networking functions (e.g., Mobile IP HA, AAA Server, DHCP, DNS, etc.). The ASN manages traffic admission and scheduling, enforces QoS for an authorized UE, and performs accounting functions for the UE (per session, flow, or UE). WiMAX PCEF is part of WiMAX IP-CAN and is to be defined by WiMAX Forum. WiMAX PCEF terminates the Gx reference point from the PCRF and may be a distributed enforcement architecture.

The PCC functional mapping to WiMAX IP-CAN is shown in FIG. 8, where PCC Gx and Rx are applied. Gx and Rx use DIAMETER.

In this access network scenario, EAP frames from the UE containing the Policy channel InfoOffer and InfoAnswer messages would be transported over IKEv2 over IP or alternatively over 802.1x to the WiMAX PCEF. The EAP frames containing the Policy channel InfoOffer and InfoAnswer messages would then be routed over DIAMETER using the Gx reference point to the PCRF. The PCRF would then, based on the Policy Info contained in the InfoOffer or InfoAnswer messages from the UE, the policies installed in the PCRF, subscriber policies fetched from the SPR, service based authorization policies installed by the P-CSCF via Rx, and knowledge of the access network the UE is using and its available resources, generate a Media policy document. The PCRF will send the Media policy document in a PolicyOffer or Policy Answer message in EAP frames over Gx to the WiMAX PCEF that then forwards to the UE in EAP transported over IKEv2 over IP to the UE.

Figure 11:
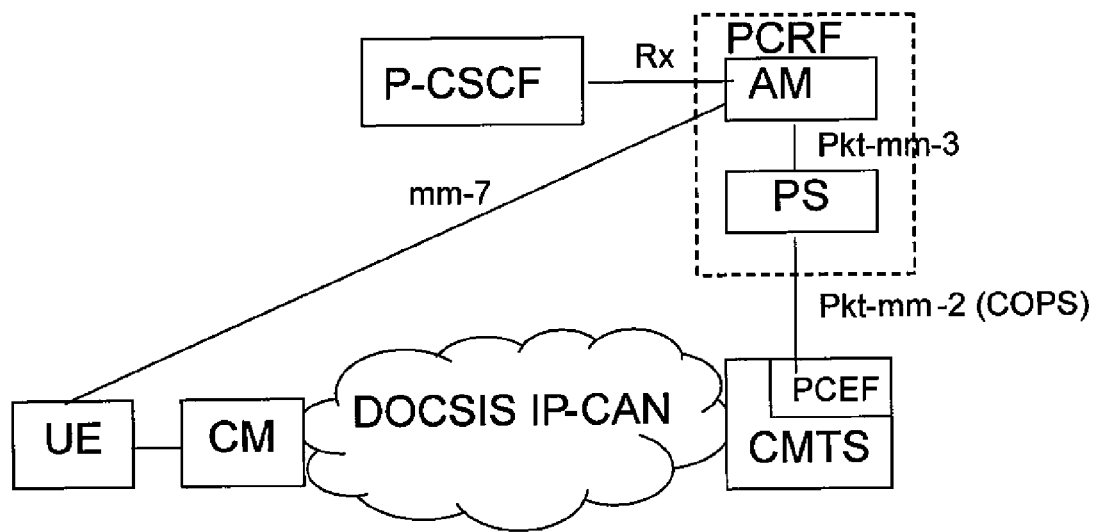
FIG. 11 is an illustration of another access network according to an embodiment of the disclosure.

FIG. 11 depicts an example of how session policy requests might be handled when the UE uses a DOCSIS IP-CAN. In the DOCSIS IP-CAN, each UE is connected to the network via a Cable Modem (CM) which is connected through a Hybrid Fiber Coax (HFC) access network to a Cable Modem Termination System (CMTS). Though the UE and CM may or may not be embedded within the same physical package, they remain separate logical devices. One or more UEs may subtend a single CM. Because the CMTS provides the IP connectivity and traffic scheduling and manages quality of service for the CM and the UEs which subtend it, the CMTS fulfils the role of PCEF for the DOCSIS IP-CAN. In the DOCSIS IP-CAN, the Application Manager (AM) and the Policy Server (PS) fulfill the role of the PCRF.

When accessing resources via a DOCSIS IP-CAN, the Rx interface can be used to request resources. The Rx interface uses DIAMETER. The communication between the AM and PS and the PS and CMTS uses the PKT-MM-2 interface, which is based on COPS and defined in J.179. COPS runs over IP and use IPsec ESP using IKE or Kerberos for key management.

The PKT-MM-2 interface performs the functions of the Gx interface but uses COPS, not DIAMETER. DOCSIS systems do not represent a full 3GPP PCC implementation but can interface to it.

DOCSIS defined an mm-7 interface between the UE and the AM to allow the UE to interact with the AM and to request and manage QoS resources directly. This interface is not yet standardized by Packet Cable.

EAP frames could potentially be transmitted over mm-7 to reach the AM and via the AM the PS. Alternatively, since DOCSIS is another 802.1x implementation, the EAP frames can be transmitted as in 802.1x to reach the CMTS, and then the COPS protocol on the PKT-MM-2 interface can be used to relay EAP frames as RADIUS attributes.

In this access network scenario, EAP frames from the UE containing the Policy channel InfoOffer and InfoAnswer messages would be transported over IKEv2 over IP to the PCRF/AM using mm-7. The PCRF (AM and PS) would then, based on the Policy Info contained in the InfoOffer or InfoAnswer messages from the UE, the policies installed in the PS, service based authorization policies installed by the P-CSCF via Rx, and knowledge of the access network the UE is using and its available resources, generate a Media policy document. The PCRF/AM will send the Media policy document in a PolicyOffer or PolicyAnswer message in EAP frames transported over IKEv2 over IP to the UE via mm-7 or via COPS and 802.1x.

Figure 12:
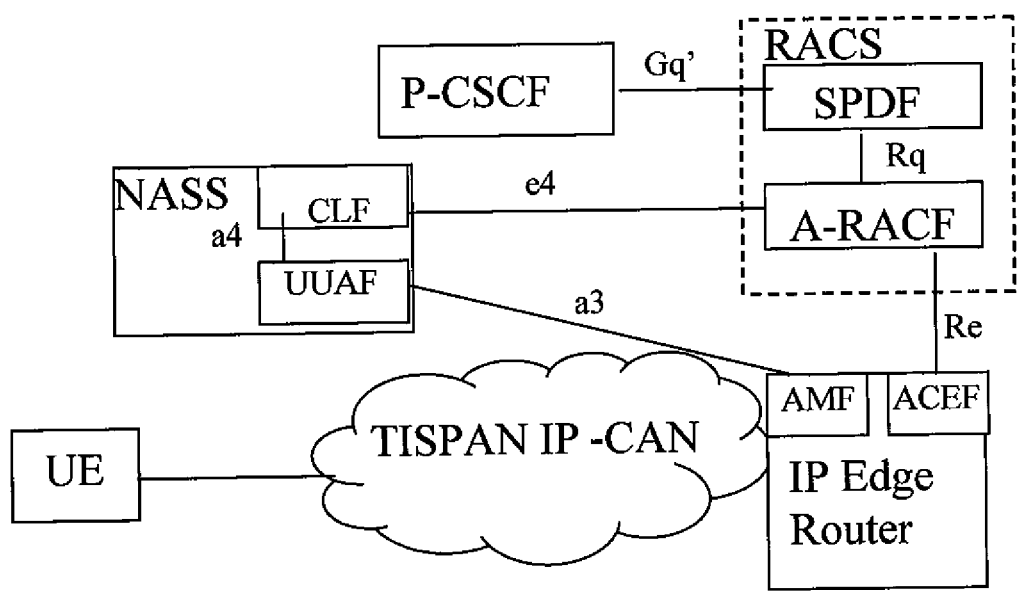
FIG. 12 is an illustration of another access network according to an embodiment of the disclosure.

FIG. 12 depicts an example of how session policy requests might be handled when the UE uses TISPAN NASS/RACS. TISPAN NGN does not use 3GPP PCC. In TISPAN NGN there is the NASS (Network Attachment Sub-System) and RACS (Resource and Admission Control System). The RAGS is responsible for elements of policing control, including resource reservation and admission control in the access and aggregation networks. The RACS provides policy-based transport control services to applications. These services enable applications to request and reserve transport resources from the transport networks within the scope of the RAGS. RACS consists of the SPDF and the A-RACF.

The SPDF is a functional element that coordinates the resource reservations requests that it receives from the P-CSCF. Among the functions that the SPDF performs is determining whether the request information received from the P-CSCF is consistent with the policy rules defined in the SPDF. The SPDF also authorizes the requested resources for the SIP session. To do so, the SPDF uses request information received from the P-CSCF to calculate the proper authorization (that is, to authorize certain media components). In addition, the SPDF provides the location of the A-RACF device in accordance with the required transport capabilities, requests resources of the A-RACF, hides the details of the RAGS and the core transport layer from the control architecture, and provides resource mediation by mapping requests from application functions toward an appropriate A-RACF.

The A-RACF is a functional element that provides admission control and network policy assembly. For admission control, the A-RACF receives requests for QoS resources from the SPDF and uses the QoS information received to perform admission control. It then indicates to the SPDF whether or not a request for resources is granted.

Access network policies are a set of rules that specify the policies that should be applied to an access line. For network policy assembly, the A-RACF ensures that requests from the SPDF match the access policies, because multiple SPDFs can request resources from the A-RACF. The A-RACF also combines the requests from the SPDFs that have requested resources and ensures that the total of the requests match the capabilities of the access line.

The SPDF issues requests for resources in the access network through the Rq interface. These requests indicate IP QoS characteristics. The A-RACF uses the IP QoS information to perform admission control and indicates to the SPDF through the Rq interface its admission control decisions. The Rq interface uses DIAMETER. The RACS performs similar policy control functions as the 3GPP PCC PCRF. The P-CSCF uses Gq' to communicate with RACS and Gq' uses DIAMETER. Gq' provides similar functionality to Rx in 3GPP PCC.

The IP Edge Router, which is equivalent to the gateway in 3GPP PCC, contains the ACEF (Access Control Enforcement Function), which performs equivalent functions to the PCEF in 3GPP PCC. The Re interface between RACS and the ACEF is not yet standardized. The IP Edge Router also contains the AMF (Access Management Function), which is a RADIUS client that interfaces to the NASS (technically the AMF is part of the NASS). The AMF translates the network access requests sent by UE, forwards the requests for allocation of an IP address and network, and forwards the user authentication requests to the User Access Authorization Function (UAAF). In the reverse direction, AMF forwards the response from the UAAF (User Access Authorization Function) within the NASS to the UE.

NASS provides registration at access level and initialization of user equipment for access to TISPAN NGN services. NASS provides network-level identification and authentication, manages the IP address space of the access network, and authenticates access sessions. NASS also announces the contact point of the TISPAN NGN service/applications subsystems to the user equipment. Network attachment via NASS is based on implicit or explicit user identity and authentication credentials stored in the NASS. Within the NASS there is the UUAF and the CLF (Connectivity Session Location and Repository Function) along with other functions not relevant here. The UAAF performs user authentication and authorization checking. The UAAF retrieves user authentication and access authorization information from the user profiles contained in the Profile Database Function (PDBF). The UAAF also collects accounting data for billing. The CLF registers the IP address allocated to the UE, the related network location information, and geographical location information provided by NACF, and associates all the information. The CLF stores the identity of user, the QoS profile of user network, and the user privacy setting of location information. The CLF provides the location query function for high-level service. The CLF communicates with A-RACF within the RACS via the e4 interface. The e4 interface uses DIAMETER. Interface a3 is used between the AMF and the UAAF. It allows the AMF to request the UAAF to authenticate the user and check the network subscription information. Interface a4 is used between the UAAF and the CLF. It allows the UAAF to request the CLF to register the association between the user identity and the user privacy setting of location information as well as user network profile information (for example, QoS profile) in the mode of Push. Interface a4 allows the CLF to query the user network profile from the UAAF in the mode of Pull. Interfaces a3 and a4 are not currently standardized.

In this access network scenario, EAP frames from the UE containing the Policy channel InfoOffer and InfoAnswer messages would be transported over IKEv2 over IP to the IP Edge Router. The EAP frames containing the Policy channel InfoOffer and InfoAnswer messages would then be routed over RADIUS using the a3 interface to the NASS (UUAF). The NASS (UUAF) would then be forwarded on using RADIUS (a4) and DIAMETER (e4) to the RACS (A-RACF). The RAGS (A-RACF and SPDF) would then, based on the Policy Info contained in the InfoOffer or InfoAnswer messages from the UE, the policies installed in the SPDF, service based authorization policies installed by the P-CSCF via Gq', and knowledge of the access network the UE is using and its available resources, generate a Media policy document. The RAGS (A-RACF) will send the Media policy document in a PolicyOffer or PolicyAnswer message in EAP frames over e4 to the NASS which will forward them on using RADIUS over a4 and a3 to the IP Edge Router that then forwards to the UE in EAP transported over IKEv2 over IP to the UE.

Figure 13:
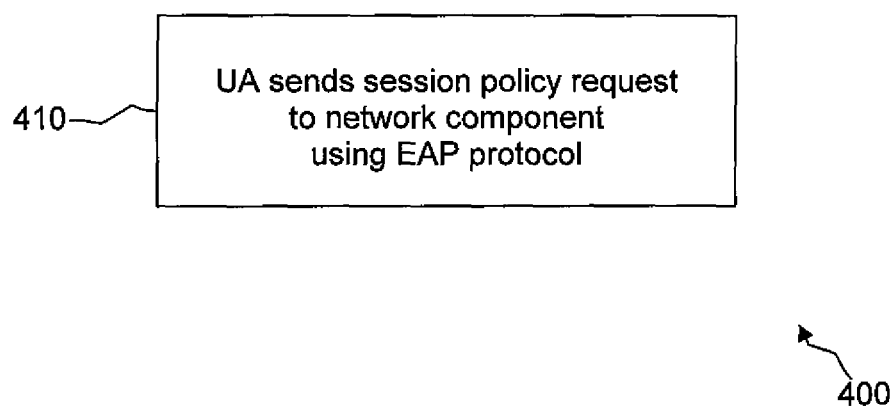
FIG. 13 is a diagram of a method for sending a session policy request to a network component according to an embodiment of the disclosure.

FIG. 13 illustrates an embodiment of a method 400 for sending a session policy request to a network component. At block 410, a UA sends a session policy request to the network component using the EAP protocol or a similar protocol such as, but not limited to, Activate PDP context. The network component might be a policy server, an authentication server, a policy control and charging rules function, a subscription profile repository, a policy control and enforcement function, a network access server, a gateway, a router, a SIP Proxy such as a CSCF (e.g., a P-CSCF or an S-CSCF), or a similar component. In some cases, the session policy request might pass through one or more of these components before terminating at another of these components.

In some cases, one or more new URI schemes might be used with the existing Policy-Contact header to ensure backward compatibility with existing SIP User Agents that only understand the SIP and SIPS URI schemes defined in draft-ietf-sip-session-policy-framework-05. In an embodiment, the new URI schemes are included in the Policy-Contact header by adding new, alternate, non-SIP URIs (for example an AAA URI) of the policy server in addition to the SIP or SIPS URI. For example, an alternate URI could be:

---

Policy-Contact: sip::host.example.com,
    aaa://pcrf.example.com; alt-uri=host.example.com

---

The above example shows an embodiment where the two policyContactURIs are actually alternate URIs of the same policy server that use different protocols on the policy channel to obtain the policy documents. This can be contrasted with the current state of the art in draft-ietf-sip-session-policy-framework-05, where URIs might be specified for two different policy servers that both need to be contacted.

A parameter (shown here as the alt-uri parameter) indicates, by containing the hostname contained in the SIP URI of the same policy server, that it is an alternate URI of the same policy server in the other policyContactURI (sip:host.example.com). Assuming that existing SIP UAs will ignore policyContactURI URI schemes that they do not understand, as mandated in draft-ietf-sip-session-policy-framework-05, all UAs that support Session Policy might need to support the SIP and SIPS schemes for obtaining policy documents. The UAs that only support SIP and SIPS URI schemes will ignore the policyContactURIs that use other URI schemes. SIP UAs that understand and support the new URI scheme and the alt-uri tag will understand that aaa://pcrf.example.com is an alternate URI or address of the same policy server at sip:host.example.com.

It should be appreciated by those skilled in the art that the parameter "alt-uri" is used to indicate that one policyContactURI is an alternative URI of another policyContactURI and that the name of the parameter could be different in different embodiments. Other possible embodiments may not contain the hostname as the value of the parameter. They could contain the SIP URI or some other indication including an index of the policyContactURI. For example, "1" could indicate the first policyContactURI, or the parameter "prev" could indicate the previous policyContactURI.

In another possible embodiment, a parameter could contain a label that would indicate that multiple policyContactURIs are for the same policy server. For example:

---

Policy-Contact: sip::host1.example1.com; label="A",
    aaa://pcrf1.example1.com; label="A",
    sip::host2.example2.com; label="B",
    aaa://pcrf2.example2.com; label="B"

---

In another possible embodiment, the SIP UA simply compares the domain name portions of the hostnames or the fully qualified domain names (FQDN) of the URIs and, if they are the same, the UA assumes that they are different policyContactURIs for the same policy server. If there are alternate policyContactURIs for the same policy server, then the SIP UA can determine which policyContactURI to use to contact the policy server.

Figure 14:
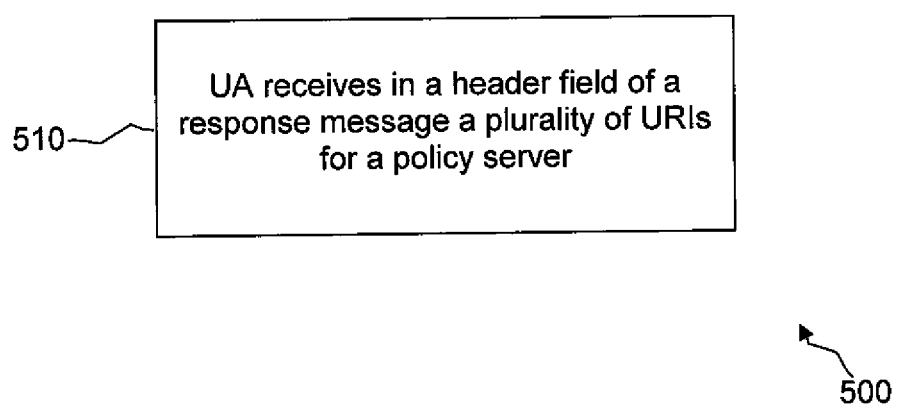
FIG. 14 is a diagram of a method for a user agent to access a session policy in a network according to an alternative embodiment of the disclosure.

FIG. 14 illustrates an embodiment of a method 500 for a UA to access a session policy in a network. At block 510, the UA receives, in a header field of a response message, a plurality of URIs for a policy server.

Being based on DIAMETER or RADIUS, the 3GPP PCC architecture supports inter-domain communication between policy servers. In an IMS session, as many as four domains (Originating Visited, Originating Home, Terminating Home, and Terminating Visited) can be involved in a session setup (even more, possibly, if transit networks are involved). Each of these domains potentially could have policies that are applied to the session (media types, codecs, etc.).

In addition, with the current session policy mechanism defined by 3GPP, potentially each proxy in each domain could have to reject a SIP INVITE request with a SIP 488 response, resulting in the calling UA having to send five SIP INVITE requests (and receive four SIP 488 responses) before the SIP INVITE request reaches the called UA. In addition, the SIP servers might need to contact each one of a plurality of policy servers to obtain policy information. This can delay call setup and drain the UA's battery.

The IETF Session Policy Framework provides a mechanism for SIP proxies to inform both the originating and terminating UAs of session policies that apply to the session. This is done by the proxies each adding the URI of their policy server to the Policy-Contact header.

DIAMETER and RADIUS enable a policy server in one domain to communicate with policy servers in other domains (subject to agreements between service providers). In an embodiment, this capability is used to allow multiple policy servers to be contacted via a single request from a UA, with the first policy server contacting the other policy servers or in a hierarchical tree. For example, the UA contacts policy server A, policy server A contacts policy server B and policy server C, policy server B contacts policy server D and policy server E, etc. The policy documents returned are then combined into a single policy document that is then returned to the UA. To achieve this, the SIP proxies indicate to the UA that other policy servers whose URIs already are listed in the Policy-Contact header can be contacted via the policy server in its domain.

draft-ietf-sip-session-policy-framework-05 defines the syntax of the Policy-Contact header field as:

---

Policy-Contact    = "Policy-Contact" HCOLON policyContactURI
                *(COMMA policyContactURI)
policyContactURI = ( SIP-URI / SIPS-URI / absoluteURI )
               [ SEMI "non-cacheable" ] *( SEMI
               generic-param )

---

The Policy-Contact URI allows additional parameters (generic-param as defined in RFC 3261). From RFC 3261:

```
generic-param  = token [ EQUAL gen-value ]
gen-value      = token / host / quoted-string
host           = hostname / IPv4address / IPv6reference
hostname       = *( domainlabel "." ) toplabel [ "." ]
domainlabel    = alphanum
                 / alphanum *( alphanum / "-" ) alphanum
toplabel       = ALPHA / ALPHA *( alphanum / "-" ) alphanum
```

Thus, using the above Backus-Naur Form, the following Policy-Contact header can be constructed:

```
Policy-Contact:   <aaa://host1.example1.com:1813>,
  <aaa://host2.example2.com:3868>; proxy-to= host1.example1.com,
  <aaa://host3.example3.com:1727>;>;
  proxy-to= host1.example1.com; proxy-to= host2.example2.com
```

In the above example, the SIP Proxy for domain example1.com has included its policy server URI, "aaa://host1.example1.com:1813". Then the SIP proxy for domain example2.com adds its policy server URI, "aaa://host2.example2.com:3868", and determines that the Policy Server for example1.com can be reached via its policy server and so adds the parameter "proxy-to" set equal to the hostname of the policy server for example1.com (host1.example1.com). Likewise, the SIP proxy for domain example3.com adds its policy server URI, "aaa://host3.example3.com:1727", and determines that the policy server for example1.com and the policy server for example2.com can be reached via its policy server and so adds the parameter "proxy-to" set equal to the hostname of the policy server for example1.com and a second "proxy-to" parameter set equal to the hostname of the policy server for example2.com.

When the UA receives the SIP Invite request or SIP 488 response containing the above Policy-Contact header, it scans the list of URIs. If a URI in the list has associated one or more proxy-to parameters containing one or more hostnames or domain names appearing in other URIs in the Policy-Contact header, the UA can, when formatting the EAP InfoOffer or InfoAnswer message, include parameters such as an Also-Contact parameter containing the AAA URIs of the policy servers from the Policy-Contact header whose hostname or domain name appears in proxy-to parameters associated with that URI listed in the Policy-Contact header. The EAP InfoOffer or InfoAnswer messages also include the intended offer or answer as defined in draft-ietf-sipping-media-policy-dataset-06.

When the first policy server receives a Policy Channel message containing an InfoOffer or InfoAnswer message containing Also-Contact parameters, it will address DIAMETER requests to the policy servers identified in the Also-Contact Parameters and will include in the Also-Contact parameters in the request the URIs from any proxy-to parameters.

When the first policy server receives policy documents from the other policy servers, it composes all the received policy documents along with its own policy document into a single policy document and returns it in a PolicyOffer or Policy Answer Message to the requestor. The first policy server also includes all the AAA URIs of all the policy servers that contributed to the contained policy document in a Policy-Contributor parameter in the PolicyOffer or PolicyAnswer message.

When the UA receives the PolicyOffer or PolicyAnswer message, it checks the Policy-Contributor parameter and ensures that the policy document represents the policies from all the policy servers that were indicated in the EAP InfoOffer or InfoAnswer message. According to draft-ietf-sip-session-policy, "If setting up a policy channel to one of the discovered policy servers fails, the UA MAY continue with the initiation of a session without contacting this policy server." However, if a policy server was not contacted, the UA will not include the URI of that policy server in the Policy-ID header in the SIP request or response. The UA includes only the policy servers for which it received confirmation that those policy servers contributed to the policy document.

Alternatively, the UA can contact all the policy servers individually in parallel using the EAP/AAA infrastructure instead of using the above consolidated approach.

In another embodiment, the P-CSCF or other SIP proxies (e.g., S-CSCFs, etc.) may use the Also-Contact parameter to inform their policy server of the Policy Contact URIs of other policy servers upstream so that the policy server can obtain the other policies or so that the P-CSCF or other SIP proxies (e.g., S-CSCFs, etc.) may themselves obtain the policy documents from other policy servers (e.g., using a SIP-based policy channel or DIAMETER or RADIUS, etc.) and then provide that policy document to their policy server. The policy server then creates an aggregated policy document based on the aggregation of the policies of the other policy servers and provides the aggregated policy document to the UA when it requests the policy document over the policy channel. The policy server may also include all the AAA URIs of all the policy servers that contributed to the contained policy document in a Policy-Contributor parameter in the PolicyOffer or PolicyAnswer message.

An AAA URI has been used in the above for simplicity, but the actual syntax of the URI scheme is not relevant to the above embodiments as any URI scheme that allows the UA or the SIP proxies (P-CSCF, S-CSCF, etc.) to contact the policy servers over an EAP/DIAMETER/RADIUS infrastructure is sufficient.

Figure 15:
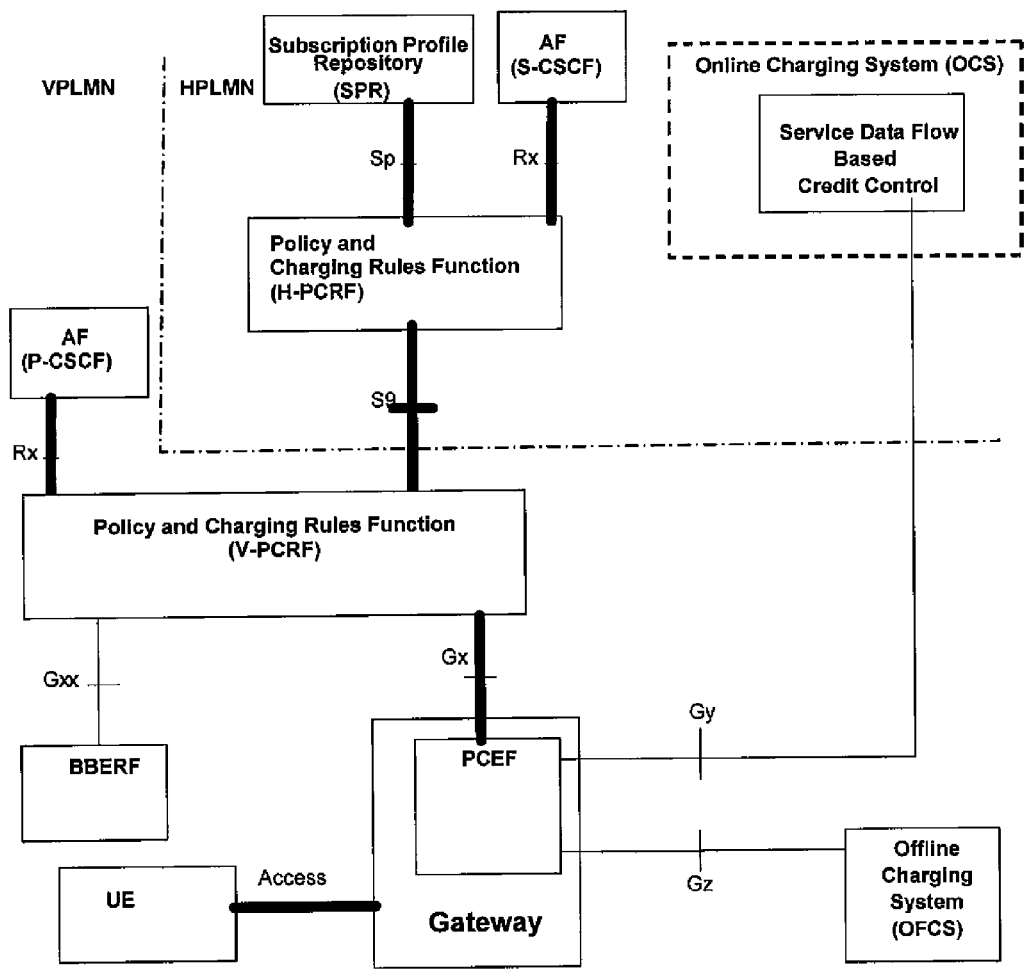
FIG. 15 is an illustration of multiple interconnected Policy Control and Charging Rules functions according to an embodiment of the disclosure.

FIG. 15 shows how multiple PCRFs in different domains may be interconnected using DIAMETER (similar connections could be provided using RADIUS) and how multiple SIP proxies (P-CSCF and S-CSCF) in different domains may provide their PCRFs with session-based input into the policies returned. For example, the S-CSCF in the user's home network may influence the policies based on the IMS Communication Service Identifier included in the SIP request.

Using this technique, a single session policy request can be made to a first policy server, and that policy server can relay the session policy request to other policy servers. The first policy server can then aggregate policy documents from the other policy servers and deliver a single policy document to the UA. More specifically, in an embodiment, since the DIAMETER and RADIUS protocols allow AAA servers (such as policy servers) to interface to each other across domains, a single policy server can supply a composite policy of the policies from multiple domains that the SIP session traverses in a single policy channel exchange. It might be desirable for a policy channel mechanism to be based around the IETF session policies framework that interfaces to the existing 3GPP PCC mechanism and DIAMETER- or RADIUS-based policy servers.

Figure 16:
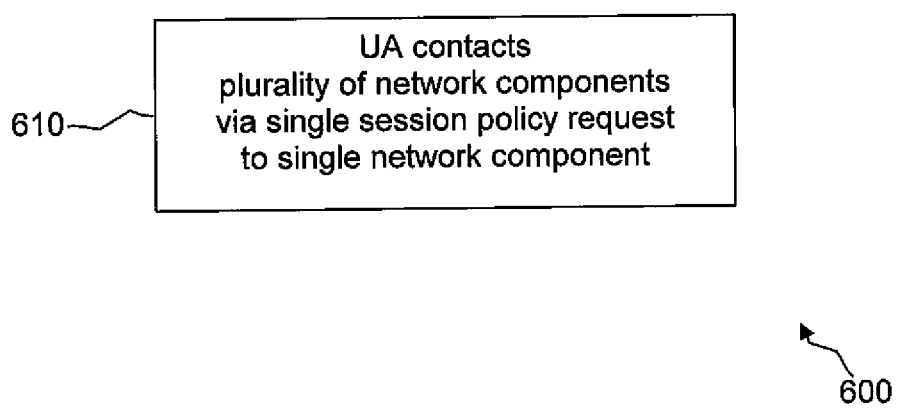
FIG. 16 is a diagram of a method for a user agent to access a session policy in a network according to an alternative embodiment of the disclosure.

FIG. 16 illustrates an embodiment of a method 600 for a UA to access a session policy in a network. At block 610, the UA contacts a plurality of network components via a single session policy request to a single network component.

In an alternative implementation, when a SIP UA wants to obtain service from the SIP infrastructure, for example an IMS network, the SIP UA sends a message such as, but not limited to, a SIP REGISTER. When a network node receives this SIP REGISTER, such as an S-CSCF initial Filter Criteria (iFC) trigger, a third party registration is made to another network node which could be, but is not limited to, a SIP server or a policy server. The SIP server is a node that contains the session policy information that is required by the SIP UA. The SIP server then sends policy information to the SIP UA via SIP push, SMS, USSD, Cellbroadcast, or MBMS. In the above examples, the policy information might be proprietary encoded or might be an OMA DM management object.

The SIP REGISTRATION could happen at any time, and the SIP UA could be provisioned such that, when it changes radio access technologies or changes its capabilities, it performs a registration. This registration information, when received by the SIP server as described above, can trigger an update of the policy information. This update might be based on the new information, such as SIP UA capabilities, or on P-Network-Access-info header information that could possibly be sent either in the third party registration or via the SIP server subscribing to the Reg Event package.

In another embodiment, the SIP REGISTRATION and third party register could trigger the SIP server to send a message to the SIP UA to perform an EAP frame request resulting in the collection of the policy information.

In yet another embodiment, when the network node, such as an S-CSCF, sends back a 200OK, this 200OK could contain the policy information or it could contain a URL that points to a location where the policy information may be obtained from. The URL could be, but is not limited to being, contained in a SIP header or embedded in XML.

In yet another embodiment, the S-CSCF/Registrar may return in the SIP 200OK to the REGISTER a Policy-Contact header containing a policyContactURI to the policy document. Other SIP proxies such as the P-CSCF on the path of the SIP REGISTER may include their own Policy-Contact headers containing the policyContactURI of their own policy server in the SIP 200OK to the SIP REGISTER directly or directly in the SIP REGISTER itself. If the policyContactURI is included in the SIP REGISTER, the S-CSCF/Registrar or other proxy can then either obtain the policy document directly and provide it to its own policy server to produce an aggregated policy document or provide the policyContactURI of the other policy server(s) so that an aggregated policy document can be produced by the policy server using the mechanisms described above. The Policy-Contact headers received in the SIP REGISTER may also be provided to the SIP UA in the SIP 200OK to the SIP REGISTER.

The mechanisms described above for identifying that a policyContactURI is an alternate URI (e.g., alt-uri parameter) and that a policy document can be obtained via another policy (e.g., proxy-to parameter) can also be used with the SIP REGISTER and SIP 200OK embodiments to allow the SIP UA to obtain the aggregated policies in an efficient manner without having to contact multiple policy servers but only contact a single policy server using the policy channel using the mechanisms described above.

draft-ietf-sip-session-policy-framework-05 does not currently define the Policy-Contact header being used in a SIP REGISTER or SIP 200OK, so this embodiment can be implemented as a SIP extension to draft-ietf-sip-session-policy-framework-05. To indicate support for this extension, the SIP UA can include a Supported header containing an option-tag such as the option-tag "policy" in the SIP REGISTER request. Based on this option-tag, the proxies, the S-CSCF/Registrar, and/or an application server via third party registration can determine that the SIP UA supports receiving Policy-Contact headers in the SIP 200OK to the SIP REGISTER.

In yet another embodiment, a UA can send a message of a first authorization type to the network, where the first authorization type could be, but is not limited to, EAP, GPRS Activate PDP context, or SIP REGISTER. Within the first authorization type message, a set of parameters can be present that identify the information such as the SIP UA, InfoOffer information, and the subscriber's identity, such as a Public User identity. Those skilled in the art will realize that the term set is a collection of well defined and distinct objects, where the number of these defined and distinct objects or information elements can be zero to many. The following is an example of such a message from the UA to the network:

EAP Code: 1 (Request)
Type: 125* SessionPolicy
Length: Variable
Value:
[NAI]
[info offer]
[info answer]
<MIC>

NAI is the identifier used by the UA to authenticate with the network. The format of the identity is defined in RFC 4282. The NAI content is used by the AAA server (RADIUS or DIAMETER) to route the policy request to the appropriate policy server. The EAP "Type" may also be used to route the EAP content.

The first authorization type message can be received by a network node that could be, but is not limited to, an AAA server, a GGSN, or a CSCF. This network node can take a set of the first authorization type information and put it into a second authorization type message that could be, but is not limited to, RADIUS, DIAMETER, or SIP REGISTER. The first lower layer message could be placed in its entirety into the second one. This second lower layer message can be sent to a second network node that can return the necessary policy information to the first network node. The first network node can do a reverse translation and send back an acknowledgement of the first authorization type to the UA containing the policy information. The following is an example of such a message from the network to the UA:

EAP Code: 2 (Response)
Type: 125* SessionPolicy
Length: Variable
Value:
[NAI]
[policy offer]
[policy answer]
<MIC>

Policy offer, policy answer, info offer, and info answer are defined in http://www.ietf.org/internet-drafts/draft-ietf-sip-ping-media-policy-dataset-06.txt If the EAP method (such as EAP-SIM or EAP-AKA) used for authentication is compliant with the EAP Keying Framework (RFC 5247), a MIC can be used to protect the session policy request/response against forgery and replay attacks. Alternatively, the session policy request/response could be protected with a shared key.

Figure 17:
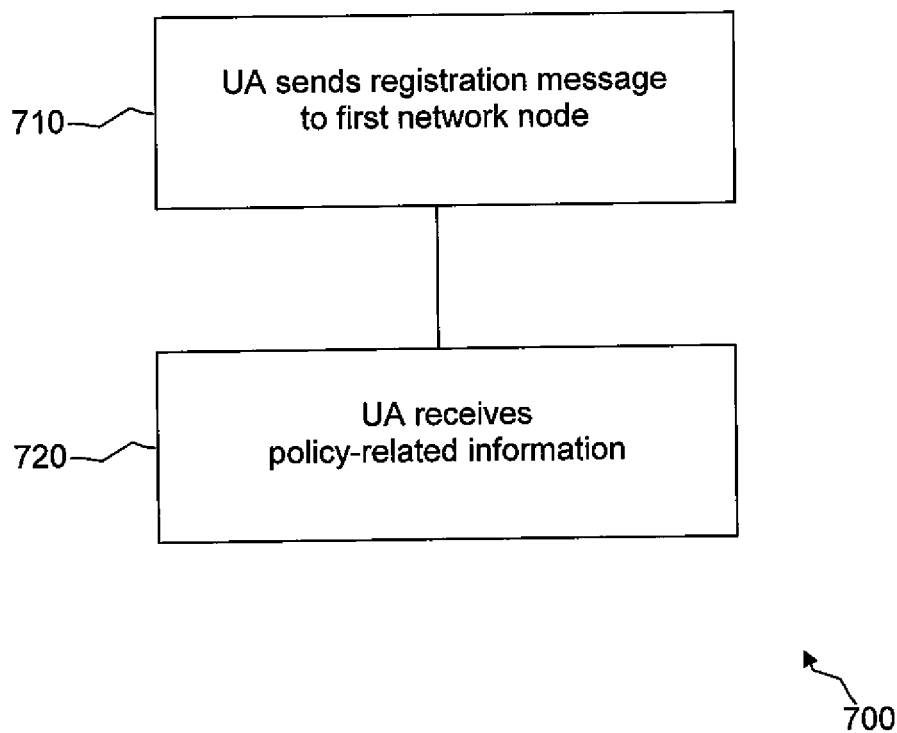
FIG. 17 is a diagram of a method for a user agent to access a session policy in a network according to an alternative embodiment of the disclosure.

FIG. 17 illustrates an embodiment of a method 700 for a UA to access a session policy in a network. At block 710, the UA sends a registration message to a first network node. At block 720, the UA receives policy-related information.

Figure 18:
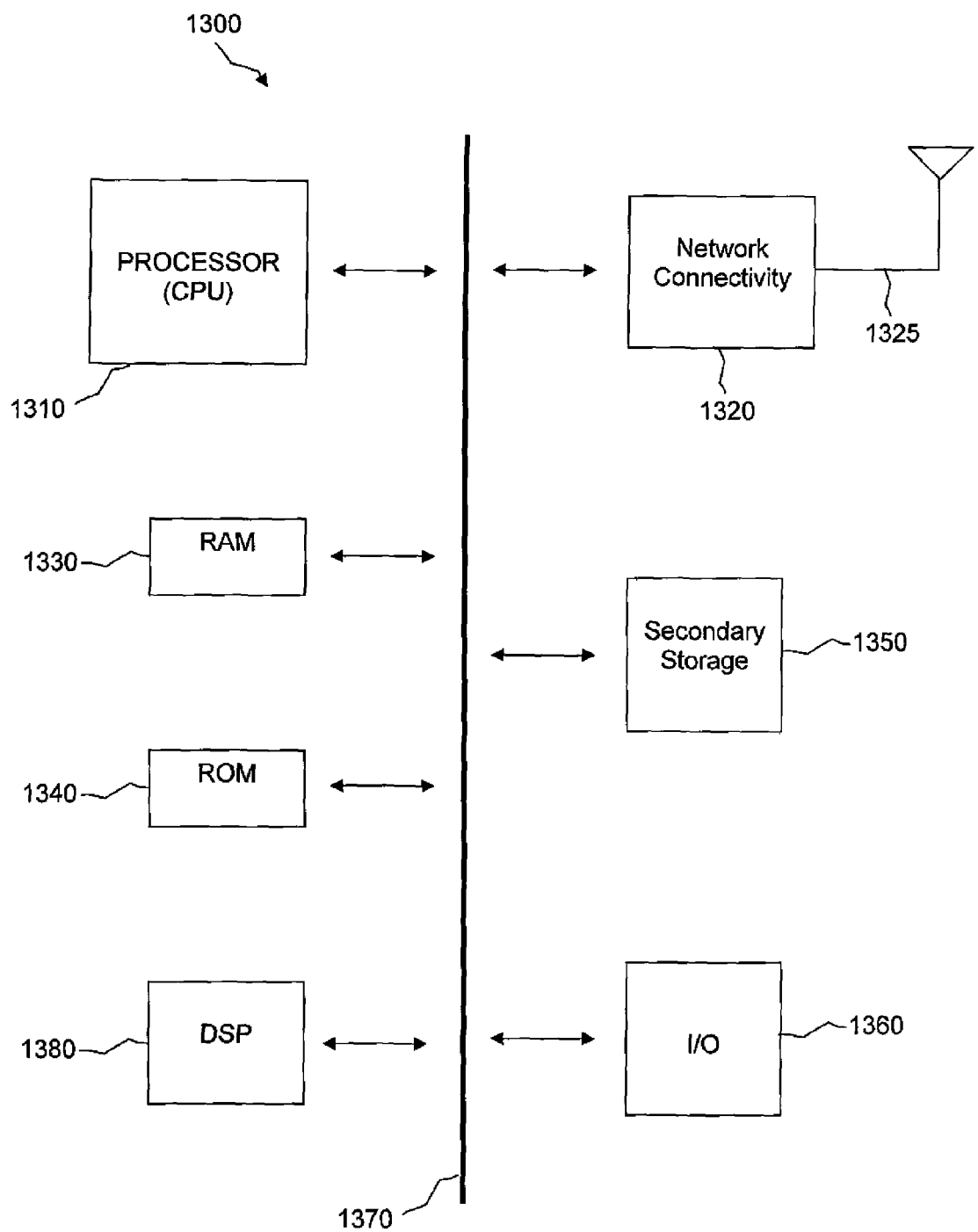
FIG. 18 illustrates a processor and related components suitable for implementing the several embodiments of the present disclosure.

The UA 110 and other components described above might include a processing component that is capable of executing instructions related to the actions described above. FIG. 18 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

Incorporated herein by reference as if reproduced in their entirety are the following IETF internet drafts:

http://www.ietf.org/internet-drafts/draft-ietf-sip-session-policy-framework-05.txt
http://www.ietf.org/internet-drafts/draft-ietf-sipping-media-policy-dataset-06.txt
http://www.ietf.org/internet-drafts/draft-ietf-sipping-config-framework-15.txt
http://www.ietf.org/internet-drafts/draft-ietf-sipping-policy-package-05.txt Also incorporated herein by reference as if reproduced in their entirety are the following 3GPP documents: RFC 2284, RFC 2661, RFC 3264, RFC 3265, RFC 3261, RFC 3312, RFC 3588, RFC 4282, RFC 4482, RFC 4566, RFC 5108, RFC 5247, TS 23.203, TS 23.228, TS 23.229, and TS 24.229.

Also incorporated herein by reference as if reproduced in their entirety are IEEE 802.11, IEEE 802.16, and IEEE 802.20.

In an embodiment, a method for a user agent to access a session policy in a network is provided. The method comprises the user agent sending a registration message to a first network node. The method further comprises the user agent receiving policy-related information from the first network node in a response to the registration message. The policy-related information is one of the session policy, a Uniform Resource Locator that points to the session policy, and a Policy-Contact header containing a policyContactURI for a policy document.

In an alternative embodiment, a user agent is provided. The user agent comprises a processor configured such that the user agent sends a registration message and receives policy-related information from a first network node in a response to the registration message. The policy-related information is one of a session policy for a network with which the user agent can communicate, a Uniform Resource Locator that points to the session policy, and a Policy-Contact header containing a policyContactURI for a policy document.

In an alternative embodiment, a network node is provided. The network node comprises a processor configured such that the network node sends policy-related information to a user agent in response to receiving a registration message. The policy-related information is one of a session policy for a network in which the network node is a component, a Uniform Resource Locator that points to the session policy, and a Policy-Contact header containing a policyContactURI for a policy document.

Additional information related to these topics can be found in U.S. Provisional Patent Application No. 61/029,522, filed Feb. 18, 2008, by Andrew Allen, et al, entitled "System and Method for Indicating Supported Session Policy URI Schemes Extensions" and in U.S. Provisional Patent Application No. 61/029,523, filed Feb. 18, 2008, by Andrew Allen, et al, entitled "System and Method for Resolving Extensions for the SIP Session Policy Framework," both of which are incorporated herein by reference.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for a user agent to access a session policy in a network, comprising:
the user agent sending a registration message to a first network node, wherein the registration message is a Session Initiation Protocol (SIP) REGISTER message; and
the user agent receiving policy-related information from the first network node in a response to the registration message, wherein the policy-related information is a Policy-Contact header containing a policyContactURI for a policy document that contains the session policy, wherein the user agent is informed to perform an authentication request that results in the reception of the policy-related information, wherein the user agent is informed via a signaling protocol other than SIP.

2. The method of claim 1, wherein the first network node is one of:
a serving call session control function; and
a registrar.

3. The method of claim 1, wherein a registration is made via the first network node to a second network node that contains the policy-related information, and wherein the user agent receives the policy-related information from the second network node.

4. The method of claim 3, wherein the second network node is at least one of:
a SIP server; and
a policy server.

5. The method of claim 3, wherein the signaling protocol is at a lower layer than Session Initiation Protocol (SIP).

6. The method of claim 5, wherein the lower layer protocol is at least one of:
Extensible Authentication Protocol (EAP); and
General Packet Radio Service (GPRS) Activate Packet Data Protocol (PDP) context.

7. The method of claim 1, wherein a registration is made via the first network node to a second network node that contains the policy-related information, wherein the user agent receives the policy-related information from the first network node, and wherein one or more Extensible Authentication Protocol (EAP) frames are used to transport the policy-related information.

8. The method of claim 7, wherein the first network node is at least one of:
a Gateway GPRS Support Node (GGSN); and
a policy server.

9. The method of claim 1, wherein the user agent is informed by the first network node to perform the authentication request that results in the reception of the policy-related information, wherein the signaling protocol is at a lower layer than SIP.

10. The method of claim 1, wherein the first network node contacts a plurality of network components in response to the registration message being received from the user agent, wherein the plurality of network components are located in different domains than the first network node, and wherein the method further comprises aggregating policy information received from the plurality of network components in the different domains, and providing the aggregated policy information to the user agent.

11. The method of claim 10, wherein the aggregated policy information is provided by the first network node using a proxy-to parameter, and wherein the aggregated policy information reflects policies for sessions in each of the different domains.

12. The method of claim 1, wherein the user agent receives in a header field of a response message a plurality of Uniform Resource Identifiers (URIs) for a policy server, each of the plurality of URIs using a different policy channel protocol, and wherein the user agent determines which of the plurality of URIs to use to obtain a policy document from the policy server.

13. The method of claim 12, wherein any of the plurality of URIs is provided in an alternative_URI parameter.

14. The method of claim 1, further comprising transmitting aggregated policy information between network components utilizing at least one protocol associated with at least one policy server, wherein the at least one protocol comprises at least one of DIAMETER and RADIUS.

15. A user agent, comprising:
a non-transitory processor configured such that the user agent:
sends a registration message, wherein the registration message is a Session Initiation Protocol (SIP) REGISTER message; and
receives policy-related information from a first network node in a response to the registration message, wherein the policy-related information is a Policy-Contact header containing a policyContactURI for a policy document that contains the session policy, wherein the user agent is informed to perform an authentication request that results in the reception of the policy-related information, wherein the user agent is informed using a signaling protocol other than SIP.

16. The user agent of claim 15, wherein a registration is made via the first network node to a second network node that contains the policy-related information, and wherein the user agent receives the policy-related information from the second network node.

17. The user agent of claim 16, wherein the signaling protocol is at a lower layer than Session Initiation Protocol (SIP).

18. The user agent of claim 17, wherein the lower layer protocol is at least one of:
Extensible Authentication Protocol (EAP); and
General Packet Radio Service (GPRS) Activate Packet Data Protocol (PDP) context.

19. The user agent of claim 15, wherein a registration is made via the first network node to a second network node that contains the policy-related information, wherein the user agent receives the policy-related information from the first network node, and wherein the policy-related information is transported in one or more Extensible Authentication Protocol (EAP) frames.

20. The user agent of claim 15, wherein the user agent is informed by the first network node to perform the authentication request that results in the reception of the policy-related information, wherein the signaling protocol is at a lower layer than SIP.

21. The user agent of claim 15, wherein the first network node contacts a plurality of network components in response to the registration message being received from the user agent, wherein the plurality of network components are located in different domains than the first network node, the first network node aggregating policy information received from the plurality of network components, and providing the aggregated policy information to the user agent.

22. The user agent of claim 21, wherein the aggregated policy information is provided using a proxy-to parameter, and wherein the aggregated policy information reflects policies for sessions in each of the different domains.

23. The user agent of claim 15, wherein the user agent receives in a header field of a response message a plurality of Uniform Resource Identifiers (URIs) for a policy server, each of the plurality of URIs using a different policy channel protocol, and wherein the user agent determines which of the plurality of URIs to use to obtain a policy document from the policy server.

24. The user agent of claim 23, wherein any of the plurality of URIs is provided in an alternative_URI parameter.

25. A network node, comprising:
a non-transitory processor configured such that the network node sends policy-related information to a user agent in response to receiving a registration message, the registration message being a Session Initiation Protocol (SIP) REGISTER message, wherein the policy-related information is a Policy-Contact header containing a policyContactURI for a policy document that contains the session policy,
wherein the network node informs the user agent to perform a lower layer protocol frame request that results in the sending of the policy-related information, wherein the network node informs the user agent via a signaling protocol other than SIP.

26. The network node of claim 25, wherein the network node is one of:
a serving call session control function; and
a registrar.

27. The network node of claim 25, wherein a registration is made via an intermediary network component to the network node, the network node containing the policy-related information, wherein the registration is made when the user agent changes network access technologies.

28. The network node of claim 25, wherein the signaling protocol is at a lower layer than Session Initiation Protocol (SIP).

29. The network node of claim 28, wherein the lower layer protocol is at least one of:
Extensible Authentication Protocol (EAP); and
General Packet Radio Service (GPRS) Activate Packet Data Protocol (PDP) context.

30. The network node of claim 25, wherein the network node, upon receiving the registration message from a user agent, contacts a plurality of other network components in different domains that the network node, aggregates policy information received from the plurality of other network components, and provides the aggregated policy information to the user agent.

31. The network node of claim 25, wherein the network node sends to a user agent in a header field of a response message a plurality of Uniform Resource Identifiers (URIs) for a policy server, each of the plurality of URIs using a different policy channel protocol, and wherein the user agent determines which of the plurality of URIs to use to obtain a policy document from the policy server.

32. The network node of claim 31, wherein any of the plurality of URIs is provided in an alternative_URI parameter.

33. The network node of claim 25, further comprising transmitting aggregated policy information between network components utilizing at least one protocol associated with at least one policy server, wherein the at least one protocol comprises at least one of DIAMETER and RADIUS.

* * * * *